(12) United States Patent
Vranish

(10) Patent No.: US 7,504,921 B2
(45) Date of Patent: Mar. 17, 2009

(54) STEPPING FLEXURES

(75) Inventor: John M. Vranish, Crofton, MD (US)

(73) Assignee: United States of America as represented by the Administrator of the National Aeronautics and Space Adminstration, Washington, DC (US)

( * ) Notice: Subject to any disclaimer, the term of this patent is extended or adjusted under 35 U.S.C. 154(b) by 56 days.

(21) Appl. No.: 11/543,278

(22) Filed: Sep. 29, 2006

(65) Prior Publication Data

US 2008/0079520 A1 Apr. 3, 2008

(51) Int. Cl.
*H01F 7/02* (2006.01)
(52) U.S. Cl. .................. 335/302; 335/212; 335/213; 335/214; 335/215; 335/303; 335/304; 335/305; 335/306
(58) Field of Classification Search ......... 335/212–215, 335/303–306, 205–207, 285
See application file for complete search history.

(56) References Cited

U.S. PATENT DOCUMENTS

| | | | | |
|---|---|---|---|---|
| 3,174,716 A | * | 3/1965 | Salter | 251/129.06 |
| 3,629,754 A | * | 12/1971 | Sobottka et al. | 335/213 |
| 5,585,772 A | * | 12/1996 | Joshi et al. | 335/215 |
| 5,703,553 A | * | 12/1997 | Bushko et al. | 335/215 |
| 5,719,451 A | * | 2/1998 | Cook et al. | 310/12 |
| 5,739,601 A | * | 4/1998 | Tsodikov | 310/26 |
| 6,246,132 B1 | * | 6/2001 | Joshi et al. | 310/26 |
| 6,249,064 B1 | * | 6/2001 | Bradbury | 310/22 |
| 6,853,103 B2 | * | 2/2005 | Moriyasu | 310/81 |
| 6,979,389 B2 | * | 12/2005 | Hao et al. | 204/192.33 |
| 7,190,247 B2 | * | 3/2007 | Zimmerling | 335/205 |
| 7,288,861 B1 | * | 10/2007 | Willard et al. | 310/15 |
| 7,323,960 B2 | * | 1/2008 | Maruyama | 335/215 |

\* cited by examiner

*Primary Examiner*—Elvin G Enad
*Assistant Examiner*—Mohamad A Musleh
(74) *Attorney, Agent, or Firm*—Matthew F. Johnston

(57) ABSTRACT

An actuator for moving a load has a frame forming a race between two surfaces thereof, at least two elements joined together by at least one flexible member, the elements and the at least one flexible member being disposed between the two surfaces of the frame that forms a race, one of the elements further joined to the load by a portion of the at least one flexible member, wherein when an element comes into contact with a surface of the frame it will stick thereto absent a repelling force, and moving means disposed to selectively attract or repel a corresponding element towards or away from one or the other of the two surfaces of the frame that forms the race. The actuator effects movement of the load in a direction towards or away from the elements, by changing a position of at least one of the elements on a surface of the frame that forms the race.

40 Claims, 18 Drawing Sheets

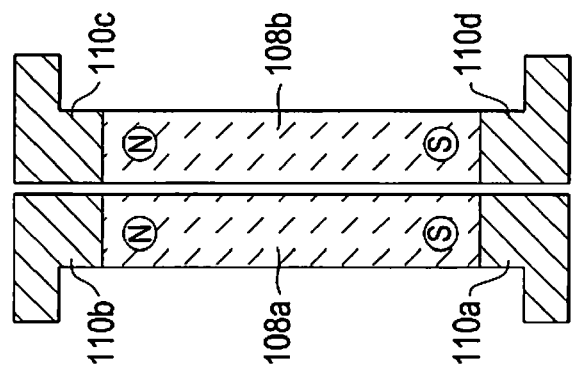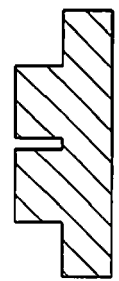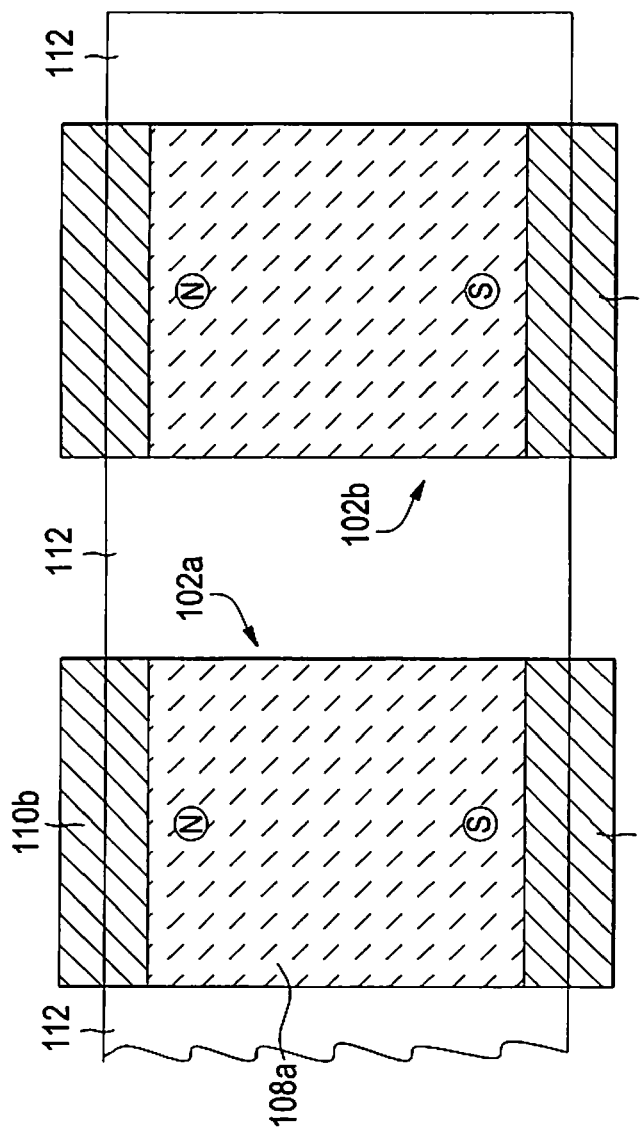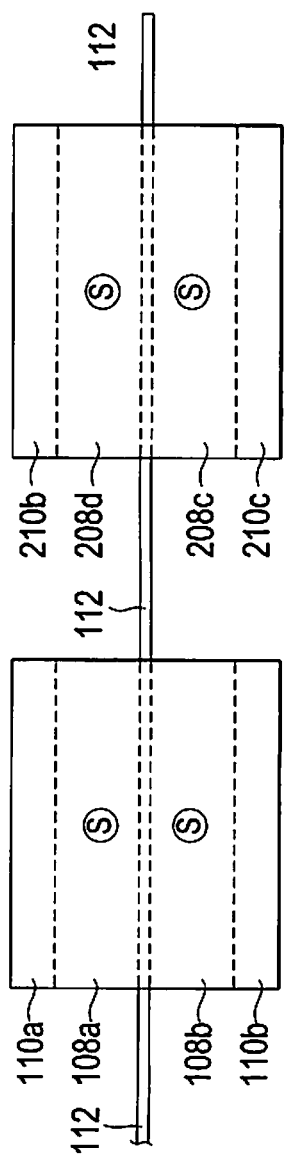

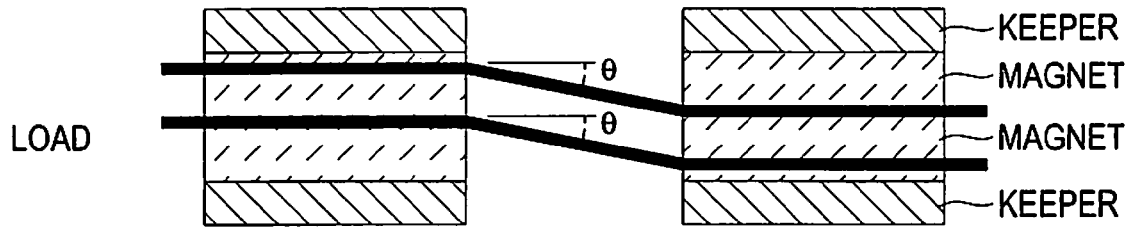
FIG. 7a LONG STROKE BENT FLEXURES
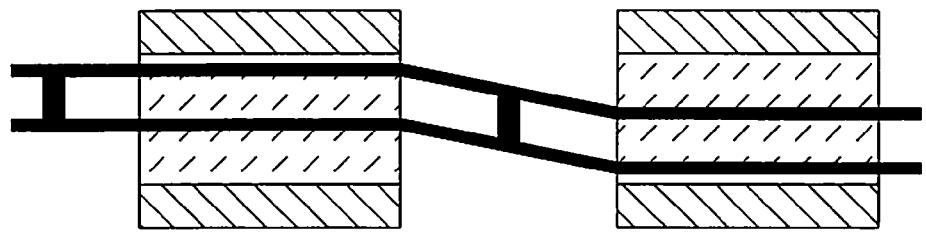
FIG. 7b LADDER LONG STROKE BENT FLEXURES
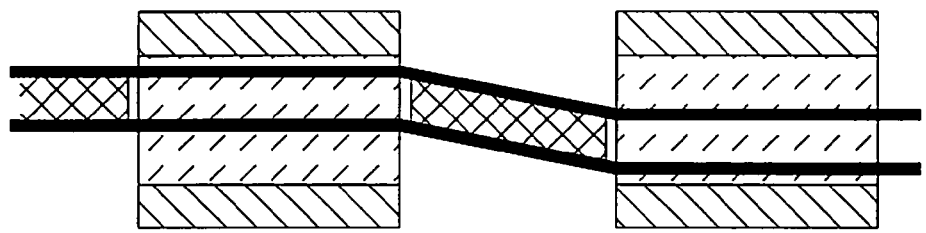
FIG. 7c COMPOSITE LONG STROKE BENT FLEXURES
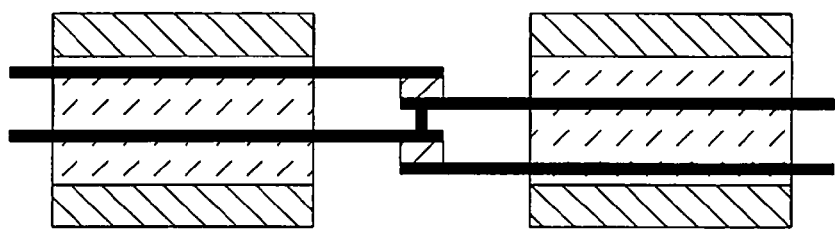
FIG. 7d FLAT LADDER LONG STROKE FLEXURES

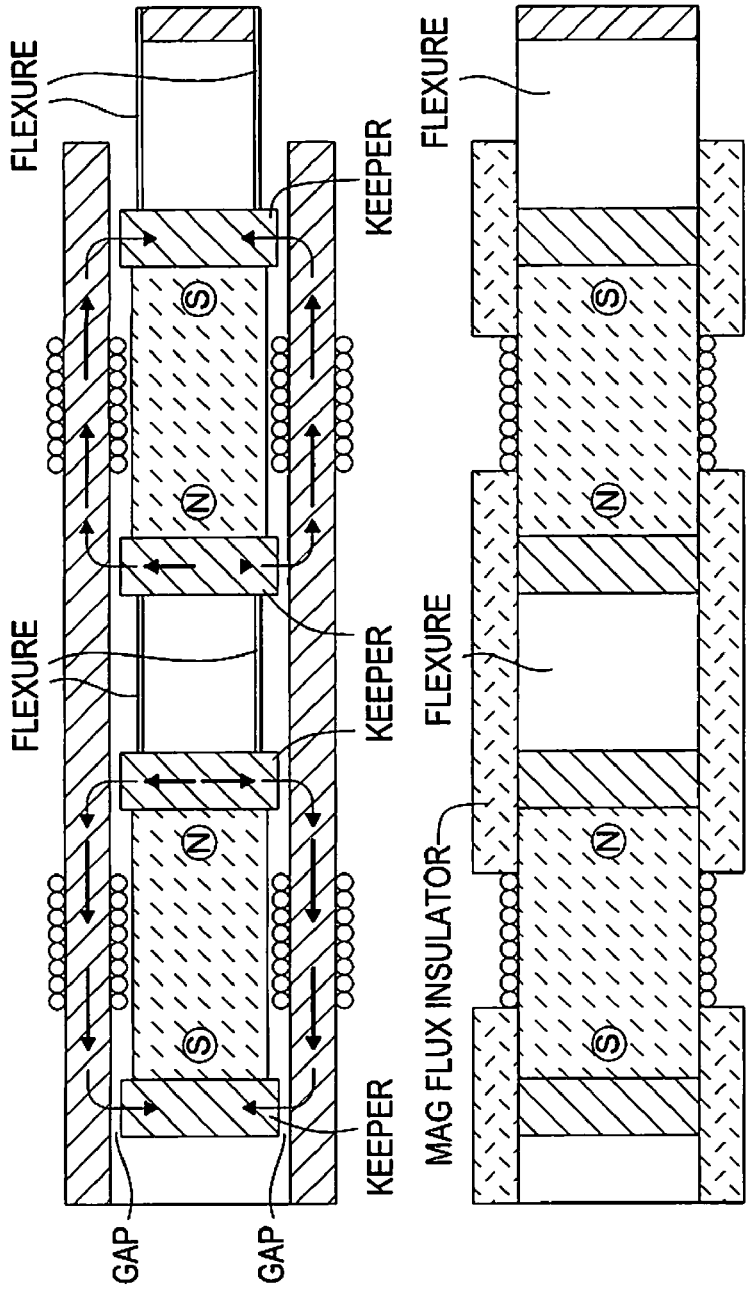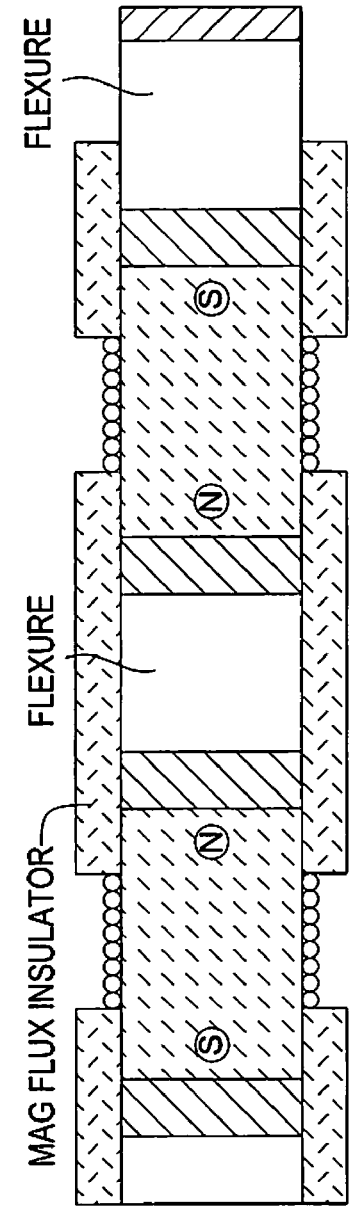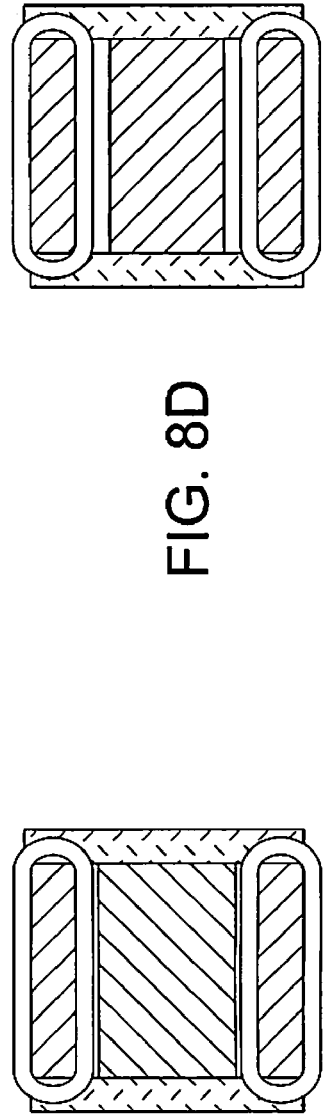
FIG. 8A  FIG. 8B  FIG. 8C  FIG. 8D

TWO COIL/SIMPLE MOVING ELEMENT

SIMPLE MOVING ELEMENT

SPLIT MOVING ELEMENT

SPLIT MAGNETS/SPLIT ELEMENT

SPLIT MAGNETS/SINGLE ELEMENT

WRAP-AROUND KEEPERS

SIDE MOTION

ASSYMETRIC KEEPERS

SINGLE ACTIVE POLE PAIR

REMNANCE SWITCH

SPLIT THIN MAGNETIC CIRCUIT
SINGLE SPLIT FLUX RETURN CIRCUIT

STEPPING FLEXURES

ORIGIN OF THE INVENTION

The invention described herein was made by an employee of the United States Government, and may be manufactured and used by or for the Government for governmental purposes without the payment of any royalties thereon or therefor.

TECHNICAL FIELD

The invention relates to the field of actuators, and in particular to high precision micro actuators.

BACKGROUND OF THE INVENTION

Various actuators are known. The term actuator as used herein refers to a device that converts electrical energy into mechanical motion, in particular, for moving a load. For example, so-called "inch worms" are known actuators. Inch worm actuators come in many forms and variations, including piezoelectric, magnetostrictive, electromagnetic, and shaped memory alloy, for example.

However, piezoelectric/electrostrictive "inch worms" have difficulties with their clamps, both in reaching their clamp races and in the excessive voltage required to drive these clamps. They also have problems due to reduced piezoelectric motion at the low temperatures such as are encountered in outer space operations, for example. Magnetostrictive "inch worms" also have difficulties with their clamps in reaching their races. Their performance does not degrade in low temperatures but, they are, unacceptably large and bulky due to their coils and mechanical preload structure. Electromagnetic "inch worms" are also large and bulky, typically do not hold position with power off and have trouble holding with their clamps. "Inch worms" in general, also typically have difficulties with "glitches" as they grasp and release during steps.

Motorized screws are known actuators. These come in many forms and variations including piezoelectric, from traveling wave and oscillatory, to one way drives, such as picomotors. These also include electromagnetic motors driving screws through a speed reducing transmission, and the electromagnetic equivalent of picomotors.

However, piezoelectric/electrostrictive motorized screws have problems associated with poor performance of the piezoelectric/electrostrictive materials in the cold temperatures of outer space operations, for example. The electromagnetic equivalent of motorized screws has the problem of achieving precise, repeatable very small steps. The small stroke of the piezo crystal helps in this respect. Electromagnetic motorized screws also tend to be large due to the windings.

Voice coils are also known actuators. However, voice coils typically do not hold position with power off, and they are relatively large and bulky.

Linear electromagnetic motors are also known actuators. However, linear electromagnetic motors typically do not hold position with power off.

Direct expansion/contraction piezoelectric/electrostrictive actuators (very short stroke) are also known actuators. However, these actuators typically do not have sufficient cumulative stroke and are limited in their cold temperature performance.

Therefore, a need exists for an improved actuator that overcomes the problems, drawbacks and limitations of the known actuators, such as those mentioned above.

STATEMENT OF INVENTION

The general purpose of the invention is to establish a superior actuator architecture.

It is an object of this invention to overcome the problems, drawbacks and limitations of known actuators, by providing an actuator designed and operated in accordance with a novel architecture.

According to an aspect of the invention, the actuator architecture can be based on a construct of multiple flat layers, so that actuators built according to plan may be easily constructed, for example, either by MEMS (micro electromechanical systems) techniques or (at the micro level) by shop wire EDM (Electric Discharge Machining) techniques.

According to an aspect of the invention, the actuator has inherent advantages in operations requiring slow speed, high force/torque gain output and precision positioning, for example.

According to an aspect of the invention, the actuator is axially stiff and will hold position with power off.

According to an aspect of the invention, the actuator is able to perform in a superior manner over a wide range of temperatures, in particular, from room temperature to the temperatures encountered in outer space, i.e., cryogenic temperatures.

According to an aspect of the invention, the actuator is very simple and robust so that performance is consistent and reliable.

According to an aspect of the invention, the actuator builds on materials that either have been tested in outer space, or are straight forward in terms of outer space qualification, in a very cost-effective manner.

According to an embodiment of the invention, an actuator for moving a load comprises a frame forming a race between two surfaces thereof; at least two elements joined together by at least one flexible member, the elements and the at least one flexible member being disposed between the two surfaces of the frame that forms a race, one of the elements further joined to the load by a portion of the at least one flexible member, wherein when an element comes into contact with a surface of the frame it will stick thereto absent a repelling force; and moving means disposed to selectively attract or repel a corresponding element towards or away from one or the other of the two surfaces of the frame that forms the race; whereby the actuator effects movement of the load in a direction towards or away from the elements, by changing a position of at least one of the elements on a surface of the frame that forms the race.

According to an embodiment of the invention, the at least two elements comprise at least two magnets, and the moving means comprises a plurality of coil pairs disposed to attract or repel a corresponding magnet towards or away from one or the other of the two surfaces of the frame that form the race, such that the corresponding element comes into contact with the respective surface of the frame and sticks thereto, or separates out of contact with the respective surface of the frame.

According to an embodiment of the invention, the at least one flexible member comprises at least one flexible, non-magnetic spring steel or aluminum material in the form of a sheet or tape, for example.

According to an embodiment of the invention, the at least one flexible member further comprises at least one pivot link.

According to an embodiment of the invention, the at least one flexible member comprises at least one pivot link disposed between the at least two elements.

According to an embodiment of the invention, the at least one flexible member comprises at least one pivot link disposed between the at least one of the at least two elements and the load.

According to an embodiment of the invention, the at least two elements further comprise respective keepers for holding the respective magnets therebetween.

According to an embodiment of the invention, the keepers comprise a soft ferromagnetic material.

According to an embodiment of the invention, each coil of the plurality of coil pairs comprises a coil of wire wrapped around a coil housing having a generally rectangular shape in cross-section with slightly rounded edges (so as not to kink the wire), an axis of the coil housing extending in a direction perpendicular to the direction of travel of the load.

According to an embodiment of the invention, magnets are permanent magnets having respective north and south poles, the permanent magnets extend between their respective north and south poles in a direction parallel to the plane of the surfaces of the frame forming the race and parallel to the direction of travel of the load, the respective north poles of each of the magnets are not all oriented in the same direction, and the respective south poles of each of the magnets are not all oriented in the same direction, and each coil of the plurality of coil pairs comprises a coil of wire wrapped around a coil housing having a generally rectangular shape in cross-section with slightly rounded edges, an axis of the coil housing extends in a direction parallel to the direction of travel of the load.

According to an embodiment of the invention, the elements each have a definite thickness extending in the direction perpendicular to the plane of the surfaces of the frame forming the race, and wherein the surfaces of the frame forming a race have a separation distance at least approximately two-thousandths of an inch greater than the thickness of each of the elements.

According to an embodiment of the invention, the at least one flexible member comprises two parallel flexures.

According to an embodiment of the invention, the two parallel flexures have a respective rung member extending between the two flexures where the flexures extend to join respective elements together, the parallel flexures sandwiching the elements therebetween.

According to an embodiment of the invention, the two parallel flexures having a respective composite material disposed between the two flexures at least in areas where the flexures extend to join respective elements together, the parallel flexures disposed to sandwich the elements therebetween.

According to an embodiment of the invention, the two parallel flexures having a respective composite material disposed between the two flexures throughout, the flexures with composite extending to join respective elements together at corresponding first surfaces thereof.

According to an embodiment of the invention, the two parallel flexures extending between the respective elements at an angle with respect to the frame surfaces.

According to an embodiment of the invention, each of the elements can assume one of at least three states with respect to the surfaces of the frame that forms a race, the at least three states being controlled by the moving means, the at least three states comprising in full frictional contact with and therefore stuck to a surface of the frame in a relatively immovable condition, in contact with a surface of the frame but in a relatively movable condition, i.e., near levitated away from contact with a surface of the frame, and out of contact with any surface of the frame, i.e., moving away from one surface and towards another surface of the frame.

According to an embodiment of the invention, activation of the moving means, each of the elements can be moved independently between the surfaces of the frame forming a race and assume a new position thereon, the new position assumed by an element after moving between the surfaces of the frame forming a race being dependent on at least the position on the surfaces of the frame forming the race of another of the elements to which the moved element is joined, the length of the at least one flexible member joining the respective elements, and the state of another element to which it is joined.

According to an embodiment of the invention, activation of the moving means, each of the elements can be moved independently along one of the surfaces of the frame forming a race and assume a new position thereon, the new position assumed by an element after moving along the frame surface being dependent on at least the position on a surface of the frame forming the race of another of the elements to which the moved element is joined, the length of the at least one flexible member joining the respective elements, the state of the element being moved, and the state of the other element to which it is joined.

According to an embodiment of the invention, an element will remain in full frictional contact with and therefore stuck to a surface of the frame in a relatively immovable condition after de-activation of the moving means.

According to an embodiment of the invention, the at least one flexible member is joined to the load at a point approximately mid-way between the two race surfaces formed by the frame.

According to an embodiment of the invention, an actuator comprising a slide, a frame and a plurality of current carrying wire coils, the slide being movable within the frame in a stepping manner by selective activation of the coils. The slide comprises at least a first and a second contact element, each contact element having at least one permanent magnet disposed between respective keepers, each contact element having a thickness, and at least one flexible member having a first portion joining the contact elements to each other, and having a second portion for joining one of the contact elements to the load by a second portion of the at least one flexible member. The frame comprises a first race surface and a second race surface, separated by a distance greater than the contact elements thickness, the contact elements and the at least one flexible member being disposed between the race surfaces. The race surfaces are composed of a material to which an element will stick once put into contact therewith. The plurality of coils comprises at least a first and second set of coils, each set of coils comprising a first coil disposed adjacent the first race surface, and a second coil disposed adjacent the second race surface, a respective first coil for moving a corresponding contact element towards or away from the first race surface to contact or separate from the first race surface when activated, and a respective second coil for moving a corresponding contact element towards or away from the second race surface to contact or separate from the second race surface when activated, the coils thereby being able to move their corresponding contact element along or between respective first and second race surfaces. Each coil of the coil sets can be individually selectively activated. The load is selectively movable a determinable step distance towards or away from the contact elements, by changing position between or along race surfaces of at least the contact element which is joined to the load by the second portion of the at least one flexible member, by selective coil activation. Further, a contact element will remain stuck to a surface of the frame in a relatively immovable condition after-de-activation of the moving means.

According to an embodiment of the invention, the load is selectively movable a determinable step distance towards or away from the contact elements, by changing position between or along race surfaces of that contact element which is joined to the load by the second portion of the at least one flexible member, and changing position between or along race surfaces of another contact element which is joined to that contact element by the first portion of the at least one flexible member, by selective coil activation. Selective coil activation, as used herein, includes for example selectively adjusting the timing between coil activations, and/or the sequence of coil activations, to determine an electronically timed step size.

According to an embodiment of the invention, the at least two elements comprise at least two movable members made of a material permeable to magnetic flux and the moving means comprises a plurality of coil and magnet pairs, disposed to attract a corresponding element towards one or the other of the two surfaces of the frame that form the race, by completion of a magnetic flux circuit through the corresponding element when a respective coil is energized, such that the corresponding element comes into contact with the respective surface of the frame and sticks thereto by virtue of remnant forces in the respective coil core even after the respective coil is de-energized.

According to an embodiment of the invention, a rotary actuator comprises a frame forming a circular race between two surfaces thereof, a movable element coupled to at least one flexible member, the element and the at least one flexible member being disposed between the two surfaces of the frame that forms a race, the element coupled to the load by a portion of the at least one flexible member, wherein when the element comes into contact with a surface of the frame it will stick thereto absent a repelling force, and moving means disposed to rotate the movable element by selectively attracting the movable element towards one or the other of the two surfaces of the frame that forms the race. The moving means comprises first and second pancake wound coils and first and second magnets, the first coil and the first magnet being disposed on one side of the movable element adjacent a first of the surfaces of the frame that forms a race, the second coil and the second magnet being disposed on another side of the movable element adjacent a second of the surfaces of the frame that forms a race, the coils and magnets thus disposed to rotate and attract the movable element towards one or the other of the two surfaces of the frame that form the race, by completion of a magnetic flux circuit through the movable element when a respective coil is energized, such that the corresponding element comes into contact with the respective surface of the frame and sticks thereto by virtue of remnant forces in the respective coil core even after the respective coil is de-energized.

According to an embodiment of the invention, the moving means comprises first and second pancake wound coils, the first coil being disposed on one side of the movable element adjacent a first of the surfaces of the frame that forms a race, the second coil being disposed on another side of the movable element adjacent a second of the surfaces of the frame that forms a race, the coils thus disposed to rotate and attract the movable element towards one or the other of the two surfaces of the frame that form the race, by completion of a magnetic flux circuit through the movable element when a respective coil is energized, such that the corresponding element comes into contact with the respective surface of the frame and sticks thereto by virtue of remnant forces in the respective coil core even after the respective coil is de-energized.

According to an embodiment of the invention, the moving means comprises first and second pancake wound coils and first and second split magnets, the first coil and the first split magnet being disposed on one side of the movable element adjacent a first of the surfaces of the frame that forms a race, the second coil and the split second magnet being disposed on another side of the movable element adjacent a second of the surfaces of the frame that forms a race, the coils and split magnets thus disposed to rotate and attract the movable element towards one or the other of the two surfaces of the frame that form the race, by completion of a magnetic flux circuit through the movable element when a respective coil is energized, such that the corresponding element comes into contact with the respective surface of the frame and sticks thereto by virtue of remnant forces in the respective coil core even after the respective coil is de-energized.

According to an embodiment of the invention, the magnets are permanent thin magnets having respective north and south poles oriented in a direction perpendicular to the planes the race surfaces, and the keepers comprise symmetric wrap-around keepers having insulators at ends thereof oriented to extend perpendicular to the planes of the race surfaces.

According to an embodiment of the invention, the magnets are permanent thin magnets having respective north and south poles oriented in a direction parallel to the planes of the race surfaces.

According to an embodiment of the invention, the magnets are permanent thin magnets having respective north and south poles oriented in a direction perpendicular to the planes of the race surfaces.

According to an embodiment of the invention, each coil of the plurality of coil sets comprises a coil of wire wrapped around a coil housing having an axis which extends in a direction perpendicular to the planes of the race surfaces.

According to an embodiment of the invention, the keepers comprise asymmetric wrap-around keepers having insulators at ends thereof oriented to extend perpendicular to the plane of the surfaces of the frame forming the race.

According to an embodiment of the invention, a method of moving a load by selective activation of the moving means, comprises moving the first element from the first surface of the frame to the second surface of the frame without moving the second element, the path traveled by the first element thereby defining an arc, wherein the distance separating the first and second elements in a direction away from the load parallel to the first and second surfaces of the frame is less than the fixed length of the first portion of the at least one flexible member, wherein the load is moved in a direction parallel to the first and second surfaces of the frame towards the elements.

According to an embodiment of the invention, the method further comprises moving the second element from the first surface of the frame to the second surface of the frame without moving the first element, the path traveled by the second element thereby defining an arc, wherein the distance separating the first and second elements in a direction away from the load parallel to the first and second surfaces of the frame is again equal to the fixed length of the first portion of the at least one flexible member, and moving the first element from the second surface of the frame to the first surface of the frame without moving the second element, the path traveled by the first element thereby defining an arc, wherein the distance separating the first and second elements in a direction away from the load parallel to the first and second surfaces of the frame is less than the fixed length of the first portion of the at least one flexible member, wherein the load is again moved in a direction parallel to the first and second surfaces of the frame towards the elements.

According to an embodiment of the invention, the method further comprises sequentially repeating the moving steps until the load has been moved a desired distance with respect to an initial position in a direction parallel to the first and second surfaces of the frame towards the elements.

According to an embodiment of the invention, a method of moving a load by selective activation of moving means comprises moving the first element from the first surface of the frame to full frictional contact with the second surface of the frame without moving the second element out of full frictional contact with the first surface of the frame, the path traveled by the first element thereby defining an arc, wherein the distance separating the first and second elements in a direction away from the load parallel to the first and second surfaces of the frame is less than the fixed length of the first portion of the at least one flexible member, wherein the load is pulled in a direction parallel to the first and second surfaces of the frame towards the elements, performing a micro-step by precisely reducing the frictional contact between each of the elements and their respective frame surfaces for a determined time duration controlled by activation of the moving means, thereby letting the load pull the elements back a small distance in a direction away from the elements parallel to the first and second surfaces of the frame, and restoring full frictional contact between each of the elements and their respective frame surfaces.

According to an embodiment of the invention, a method of moving a load by selective activation of the moving means, comprises moving the second element from the first surface of the frame to full frictional contact with the second surface of the frame without moving the first element out of full frictional contact with the first surface of the frame, the path traveled by the second element thereby defining an arc, wherein the distance separating the first and second elements in a direction away from the load parallel to the first and second surfaces of the frame is less than the fixed length of the first portion of the at least one flexible member, and moving the first element from the first surface of the frame to full frictional contact with the second surface of the frame, and before the first element has come into full frictional contact with the second surface of the frame: precisely reducing the frictional contact between the second element and the second surface of the frame for a determined time duration controlled by activation of the moving means, thereby allowing the load and the moving of the first element between the first and second surfaces of the frame to push the second element back a small distance in a direction away from the load parallel to the first and second surfaces of the frame, and then restoring full frictional contact of the second element with the second surface of the frame, the path traveled by the first element thereby defining an arc, wherein after the completion of the moving of the first element to the second surface, the distance separating the first and second elements in a direction away from the load parallel to the first and second surfaces of the frame is again equal to the fixed length of the first portion of the at least one flexible member, wherein the load is pushed in a direction parallel to the first and second surfaces of the frame away from the elements.

According to an embodiment of the invention, curved surfaces for contacting the respective race surfaces of the frame are provided on the keepers.

According to an embodiment of the invention, wherein the at least one flexible member comprises a single central flexible member.

According to an embodiment of the invention, an actuator for moving a load has a frame forming a race between first and second parallel surfaces thereof, first, second and third elements, and at least one flexible member. The first element and the second element are joined together by a first portion of the at least one flexible member, and the second element and the third element are joined together by a second portion of the at least one flexible member. The elements and the at least one flexible member are disposed between the first and second surfaces of the frame that form a race. The first element is joined to the load by a third portion of the at least one flexible member. The first, second and third portions of the at least one flexible member each have a respective fixed length. When an element comes into contact with a surface of the frame it will stick thereto absent a repelling force. The actuator also has moving means disposed to selectively attract or repel a corresponding element towards or away from one or the other of the first and second surfaces of the frame that form the race. Assuming the first, second and third elements are in an initial position in contact with and stuck to the first surface of the frame that forms a race, separation distances between the respective elements in a direction away from the load parallel to the first and second surfaces being the respective fixed lengths of the respective portions of the at least one flexible member, a method of moving a load by selective activation of the moving means includes moving the third element from the first surface of the frame to the second surface of the frame without moving the first or the second elements, the path traveled by the third element thereby defining an arc, whereby the distance separating the second and third elements in a direction away from the load parallel to the first and second surfaces of the frame is less than the fixed length of the second portion of the at least one flexible member; moving the second element from the first surface of the frame to the second surface of the frame without moving the first or the third elements, the path traveled by the second element thereby defining an arc, whereby the distance separating the first and second elements in a direction away from the load parallel to the first and second surfaces of the frame is less than the fixed length of the first portion of the at least one flexible member; and moving the first element from the first surface of the frame to the second surface of the frame without moving the second or third elements, the path traveled by the first element thereby defining an arc, wherein the distance separating the first and second elements in a direction away from the load parallel to the first and second surfaces of the frame is again equal to the fixed length of the first portion of the at least one flexible member. Thus, the load is moved in a direction parallel to the first and second surfaces of the frame away from the elements.

According to an embodiment of the invention, where the moving means can exert a partial-repelling force on an element which is sufficient to allow the element to move along a surface of the frame in response to an external force, a method of moving a load by selective activation of the moving means, includes exerting a partial-repelling force on the third element while moving the second element from the first surface of the frame to the second surface of the frame without moving the first element, the path traveled by the second element thereby defining an arc, whereby the distance separating the second and third elements, and the distance separating the second and first elements, in a direction away from the load parallel to the first and second surfaces of the frame is less than the fixed length of the first portion of the at least one flexible member, and whereby the third element is moved a distance along the first surface of the frame; and exerting a partial-repelling force on the first element while moving the second element from the second surface of the frame to the first surface of the frame without moving the third element, the path traveled by the second element thereby defining an arc, whereby the distance separating the second and third elements, and the distance separating the second and first elements, in a direction away from the load parallel to the first and second surfaces of the frame again equal to the fixed length of the first portion of the at least one flexible member. Thus, the load is moved in a direction parallel to the first and second surfaces of the frame away from the elements.

Actuators made according to the above aspects and objects of the invention are contemplated to have a variety of uses. These uses include, but are not limited to, for example, a series of micro actuators and active structures in space craft and science instruments having unprecedented accuracy and precision, and which work both in the cryogenic temperatures of outer space and at room temperatures during test and development; medical and manufacturing clean room operations which require ultra precision, control and reliability; to replace hydraulics and pneumatics with equivalent electrical drives of all kinds and all configurations; and everything from aerospace precision positioning actuators to many different types of low speed, high torque/force and ultra compact actuators which hold position with power off.

Actuators according to embodiments of the present invention would be useful in aircraft/missiles/reentry space craft applications, including flap and aileron movement, landing gear movement, wind and fuselage local deformations to enable enhanced aerodynamics.

Actuators according to the present invention would be useful in automobile applications, including brakes, "drive by wire" shifting, odds and ends such as windows, power seats, mirror adjustments, sun roof movement, power jacks, etc.

Actuators according to the present invention would be useful in machine shop applications, including automated flexible fixtures, changing, adjusting and holding/releasing tools, precision moving stages of numerically controlled machine tools, adjusting and precision positioning work pieces, vibration control, safety braking, as well as odds and ends, such as opening doors and lids.

Actuators according to the present invention would be useful in medical applications and clean room/chip manufacturing, including precision, miniature robots to assist/perform surgery, micro position probes, precision miniature robots to move and position wafers and the tools which operate on them, and precision positioning of microscope stages for both medical applications and for chip manufacturing.

Actuators according to the present invention establish a new and more effective architecture for MEMS (micro electromechanical systems) actuators. In this regard, an actuator according to an embodiment of the invention, is constructed in a series of flat layers, converting up and down vibration into precision forward motion, holding position with power off, thus being simple, and driving with exceptional force magnification due to "flexure" transmission.

Further, such an actuator is under control at all times, and does not require bearings. The above properties make an actuator according to an embodiment of the invention suitable to MEMS (micro electromechanical systems) actuator applications.

Actuators according to embodiments of the present invention have many advantages over known actuators. In particular, advantages of embodiments of the present invention over so-called "inch worms" include, for example, the ability to handle relatively large gaps in the clamping system with ease and no force droop; very simple and robust construction; performing precision, with highly repeatable step sizes; naturally and indefinitely holding position with power off; an operation range from room temperature to cryogenic temperatures with no significant fall off in performance; and no exotic and/or special materials, such as piezoelectrics and magnetostrictives, are required.

Advantages of embodiments of the present invention over "motorized screws" include a more direct and simple construction and operation than motorized screws; the ability to more easily be miniaturized due to having fewer parts; being more easily constructed using MEMS (micro electromechanical systems) techniques because construction architecture comprises a series of plates; and having more precise operation by elimination of the "rattle" and clearances of interfaces between motor and screw and nut, for example.

Advantages of embodiments of the present invention over "voice coils" include holding position with power off; providing more force in a more compact package; and superiority in slow speed operations, for example.

Advantages of embodiments of the present invention over "linear motors" include more force in a more compact package; a simpler construction; more precise steps; holding position with power off; and not requiring bearings, for example.

Advantages of embodiments of the present invention over "direct expansion/contraction piezoelectric/electrostrictive actuators" include a long stroke capability; holding position more naturally with power off; and not requiring exotic materials such piezoelectric/electrostrictive or magnetostrictive materials, for example.

These and other aspects, objects and advantages of embodiments of the invention will become apparent from the detailed description set forth below.

BRIEF DESCRIPTION OF DRAWINGS

FIGS. 3a-c illustrates top, side and end views of a slide according to the exemplary embodiment of the invention of FIG. 1.

FIG. 6a illustrates parallel flexures; FIG. 6b illustrates parallel flexures bending; FIG. 6c illustrates ladder flexures bending; FIG. 6d illustrates composite parallel flexures bending; and FIG. 6e illustrates offset composite parallel flexures.

FIGS. 7a-d illustrate several long-stroke parallel flexure alternative arrangements according to alternative embodiments of the invention, in particular: FIG. 7a illustrates long stroke bent flexures; FIG. 7b illustrates ladder long stroke bent flexures; FIG. 7c illustrates composite long stroke bent flexures; and FIG. 7d illustrates flat ladder long stroke flexures.

FIGS. 8a-d illustrate various views of an alternative embodiment of the invention referred to as the "side winder"

magnified by a factor of four, in particular, FIG. 8a is a side sectional view, FIG. 8b is a top view, FIG. 8c is a back view, and FIG. 8d is an end view.

FIG. 9a illustrates a two-coil simple moving element embodiment, FIG. 9b illustrates a two coil simple linear/rotary element, FIG. 9c illustrates a split moving element, and FIG. 9d illustrates a variation with split magnets and split elements.

FIG. 11a illustrates a wrap-around keepers embodiment, FIG. 11b illustrates a "side motion" embodiment, and FIG. 11c illustrates an asymmetric keepers embodiment.

FIG. 12a illustrates a single active pole pair embodiment, and FIG. 12b illustrates a remnance switch embodiment.

DETAILED DESCRIPTION OF THE INVENTION

The invention will now be described in more detail by way of example with reference to the embodiment(s) shown in the accompanying figures. It should be kept in mind that the following described embodiments are only presented by way of example and should not be construed as necessarily limiting the inventive concept to any particular physical configuration.

Figure 1A:
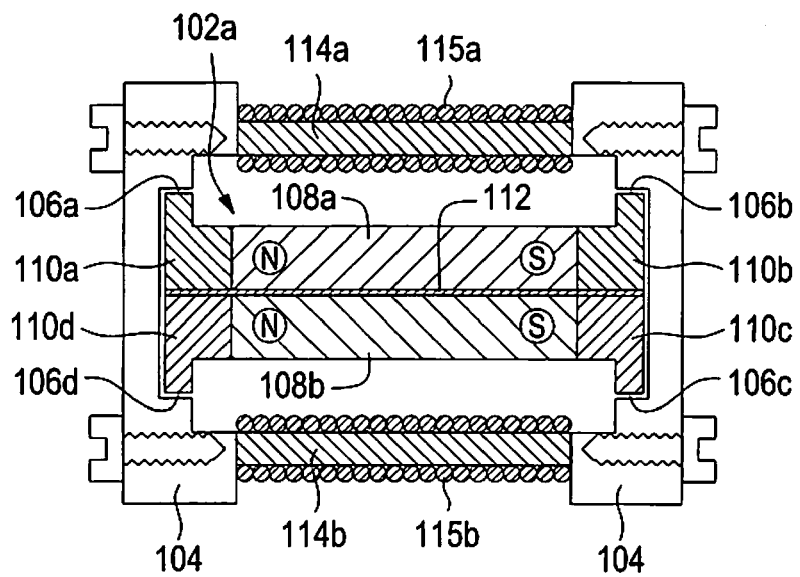
FIGS. 1a and 1b illustrate end and top views of a linear stepping flexure according to an exemplary embodiment of the present invention.
Figure 1B:
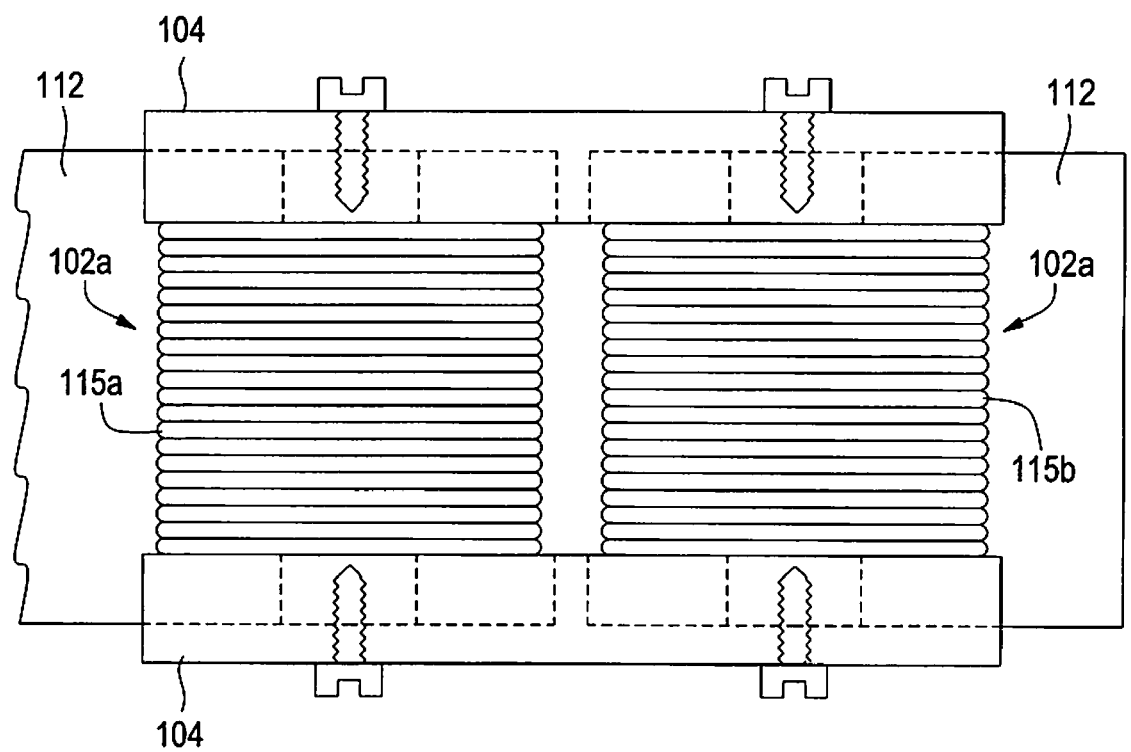
Figure 2A:
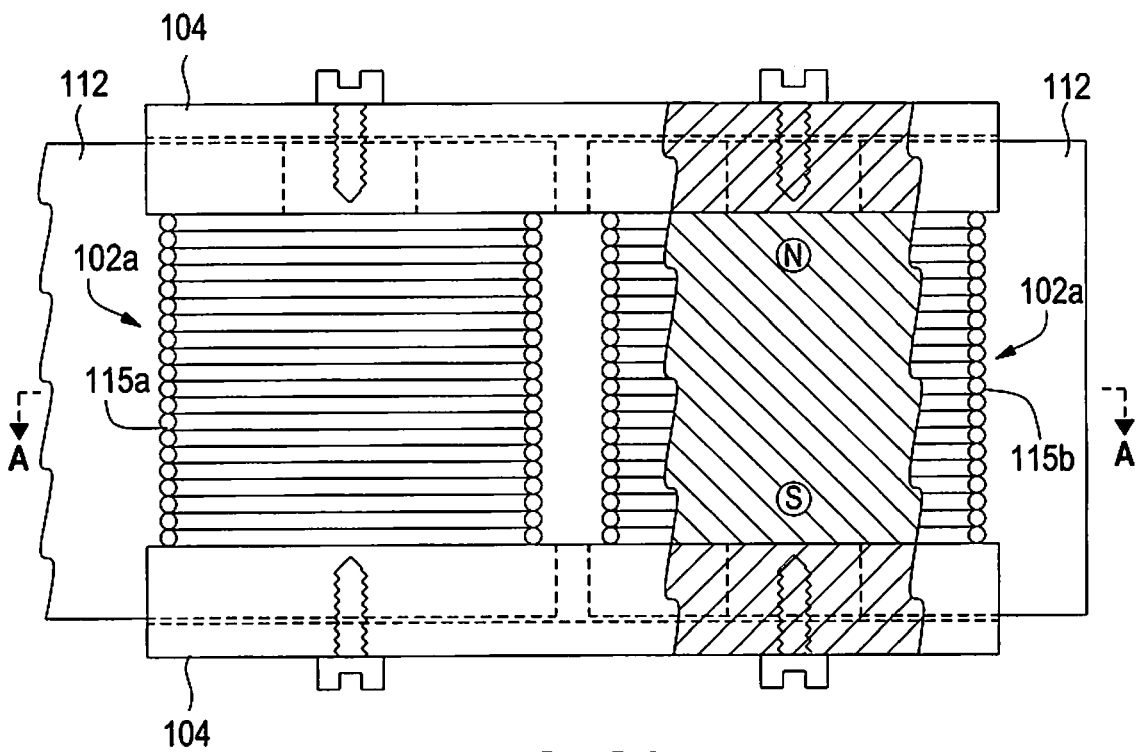
FIGS. 2a illustrates a partial cut-away view of the embodiment according to FIG. 1.
Figure 2B:
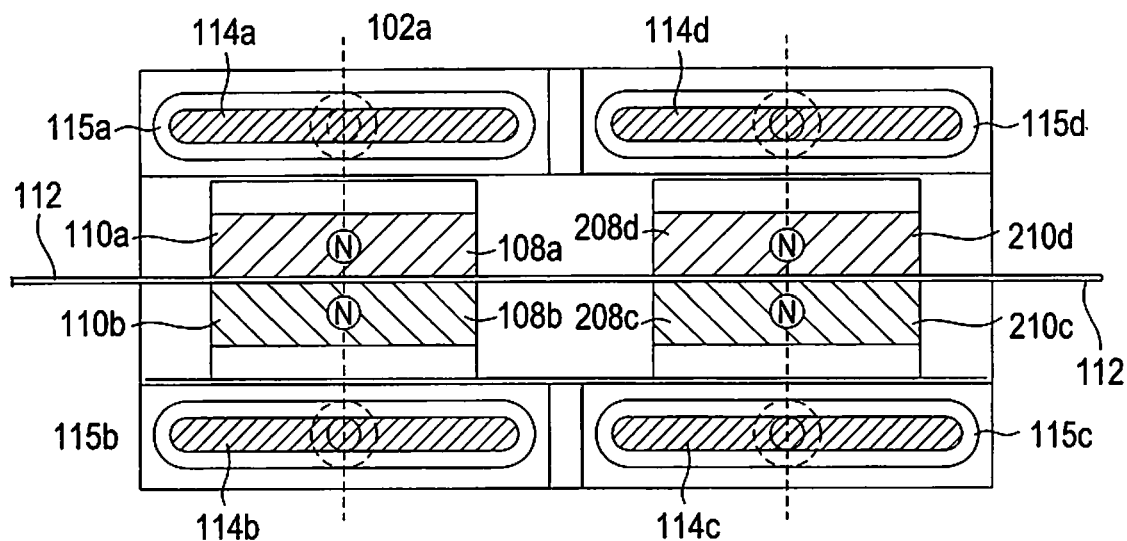
FIG. 2b illustrates a section of FIG. 2a, taken along line A-A, according to an exemplary embodiment of the invention.

A first embodiment of a linear flexure stepper is illustrated in FIGS. 1, 2 and 3. In particular, FIGS. 1a and 1b illustrate magnified end and top views, and FIG. 1c illustrates an exemplary actual size of a linear stepping flexure according to an exemplary embodiment of the present invention. FIG. 2a illustrates a partial cut-away view of the embodiment according to FIG. 1, and FIG. 2b illustrates a section of FIG. 2a, taken along line A-A, according to an exemplary embodiment of the invention. FIGS. 3a-c illustrate top, side and end views of a slide according to the exemplary embodiment of the invention of FIG. 1. A stepping sequence for this embodiment is illustrated in FIG. 4. This device may also be referred to herein as a "tape crawler".

With reference to FIGS. 1a and 1b, an exemplary embodiment of the invention is shown magnified by a factor of four in an end view in FIG. 1a and in a top view in FIG. 1b. FIG. 1c shows actual top, side and end sizes contemplated for a typical implementation of this embodiment.

As can be seen from FIGS. 1a and 1b, this exemplary embodiment comprises a pair of flexure steppers or "slides" 102, which may also be referred to as "contact elements" herein, in a housing or "frame" 104 having surfaces 106a-106d forming a race along which the slides 102a and 102b step. The flexure steppers or "slides" 102 are also illustrated in FIG. 3.

In this exemplary embodiment, each stepper 102 comprises at least one magnetic element, in this case, a pair of permanent magnets 108a and 108b, with respective separate and individual keepers 110a, 110b and 110c, 110d, preferably made of a soft ferromagnetic material attached to the poles of each respective magnet 108a,b. In this embodiment, a flexible member 112 comprising a flexible tape or sheet of flexible material, for example, also referred to herein as a "flexure," is provided sandwiched between the magnet pairs 108a,b, and extending between the stepping elements 102. The flexible tape or "flexure" 112 further extends beyond the stepping elements 102 and attaches to a load (not shown) to be moved. The flexible member may incorporate one or more pivot links as will be explained further below.

Experiments with an implementation of this embodiment have shown that there is a tendency to demagnetization of the permanent magnets 108. One way to overcome this tendency would be to make the flexible member (flexure) 112 of a ferrous material, for example. Alternatively, a modification of this exemplary illustrated embodiment could be implemented having two flexible members (flexures) 112, disposed to sandwich the magnets 108 therebetween, as is described later herein with respect to FIGS. 16-18.

Depending on the specific requirements of an implementation, if the material the flexible member is made from does not provide enough flexibility for a particular application, for example, the flexible member may incorporate at least one pivot link about which it can pivot, relieving some or all of the flexing force put on it by the positioning/movement of a respective element or elements. The at least one pivot link may be disposed at any suitable location, i.e. between the at least two elements, and/or the at least one pivot link may be disposed between an element and the load, for example. As would be apparent to one skilled in the art, a pivot link may be disposed in any location where pivoting is advantageous or may be required for a particular application. A respective pivot link could be provided at each respective point where the flexible member meets an element, or only at some point along the flexible member between respective elements, such as at the mid-point, for example.

Some of the factors that may determine whether or not to use pivot links in a particular application may include the possible effects of repeated bending, e.g. metal fatigue, on the operational lifetime of the flexible member if no pivot links are used; the potential added expense and complexity of manufacture of pivot linkage, since one desired aspect of the invention is that the actuator architecture be based on a construct of multiple flat layers; and the requirement for pivot linkage lubrication, for example.

Besides forming the race with surfaces 106a-d, the frame 104 supports coils 115 which operate as moving means to effect the movement of the stepper elements 102, as will be described below. The coils can be selectively activated to achieve the desired step size and thereby the load movement distance. This selective coil activation, as used herein, includes for example selectively adjusting the timing between coil activation(s), and/or the sequence of coil activation(s), to determine an electronically timed step size.

In the illustrated exemplary embodiment of FIGS. 1-3, there are provided two pairs of coils 115, one pair of coils 115 for each stepper element 102. With reference to FIG. 1a, the frame 104 supports coil housings 114, one for each coil 115 (in this embodiment—four coils, therefore, four coil housings). As mentioned above, in this exemplary embodiment, the four coils 115a-d can be activated (energized) independently to achieve the stepping movement desired.

As can be best seen in FIG. 1a, the stepping elements 102 are disposed within the frame, separated by some distance, referred to as a "gap," from the frame 104. As indicated, the gap between the stepper elements 102 and the surfaces 106 of the frame forming the race is approximately 0.002 to 0.005 inches, for example. This dimension is mathematically related to the step size, as will be explained in detail below. However, this dimension may be varied without departing from the scope and spirit of the invention. The dimension of the gap is fundamentally a matter of design choice, dependent on the dimensions of the other structures, the selection of materials, and the particular configurations of an implementation, which are chosen to provide efficient and reliable operation, and thus are subject to some range of variation, as would be understood by one skilled in the art.

The gap size used in an experimental implementation was 0.010 inches, and it should be understood that this dimension is subject to some variation depending on design criteria and practical requirements, as would be apparent to one skilled in the art, and such variation is considered to be within the spirit and scope of the invention described herein.

In this embodiment, the frame 104 is preferably a soft ferromagnetic material such as Hiperco 50A. The keepers 110 are preferably also made of a soft ferromagnetic material.

The flexible member 112, tape or flexure, is preferably a relatively thin, non-magnetic material, for example, a sheet or tape of flexible, non-magnetic spring steel or aluminum, and should be able to withstand repeated bending without failure due to metal fatigue, for example. As mentioned above, if advantageous in this regard for a particular application, pivot links may be incorporated in the flexible member 112.

The coils 115 comprise a number of windings, for example, 20 turns of 0.030 inch diameter wire on a coil having a length of 0.625 inches carrying an activation current of approximately 100 milliamps. The magnets may be made of a high-performance magnetic material, for example, neodemium boron iron or samarium cobalt.

The operation of the first embodiment of a linear stepping flexure will now be explained with reference to FIG. 4. FIGS. 4a-e show basic forward motion flexure stepping (macro-stepping) as a sequence of five steps, reading from top (4a) to bottom (4e). In these figures the actuator is shown in simplified block diagram form, the slides illustrated as blocks labeled "1" and "2," with the flexure shown as a line running horizontally between these blocks, from block 1 to the load (not shown).

Figure 4A:
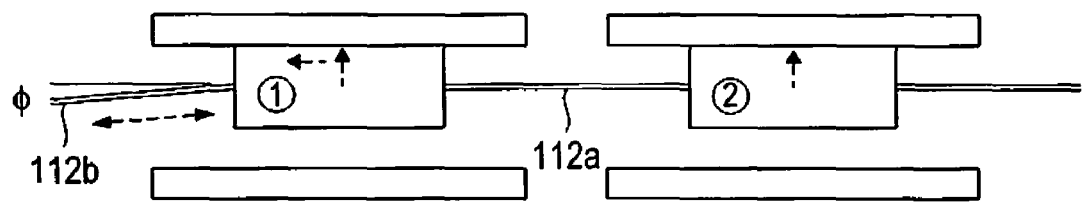
FIGS. 4a-e illustrate basic forward motion flexure stepping. (macro-stepping) as a sequence of five steps, according to the exemplary embodiment of the invention of FIG. 1.

Initially in this example, as shown in FIG. 4a, the permanent magnets of the two slides 1 and 2 are attracted to the top race of the frame, and slides 1 and 2 are firmly fixed in position as shown. In this condition, the flexure portion 112a between the two permanent magnets of the slides 1 and 2 is straight (zero degrees bend), and the flexure portion 112b between the load (not shown) and the permanent magnet of the slide 1 nearest the load, is at some angle $\phi$. The coils (not shown) need not be energized at this stage of the operation, and the frictional forces generated between the permanent magnet of the slide 1 nearest the load (left-hand side of the figure) and the frame, prevent the slide from moving. This, along with the relative stiffness of the flexure portion 112b against further bending or stretching, therefore, holds the load in position some horizontal distance from the slides 1 and 2.

Figure 4B:
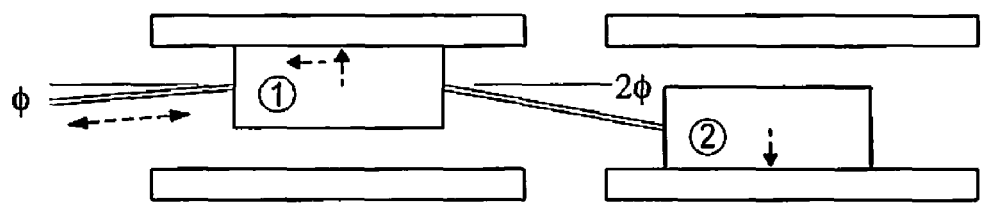

Next referring to FIG. 4b, the slide 2 is switched to the bottom race of the frame by activation of at least one of the associated coils (not shown) for the slide 2, overcoming the force holding the slide 2 to the upper race of the frame. After this action, the flexure section 112a between slides 1 and 2, is bent to some angle $2\phi$ (as can be seen in FIG. 4b.). In the process, slide 2 has moved slightly closer to slide 1 in the horizontal direction. The load continues to be held in the same position by slide 1 at this time.

Figure 4C:
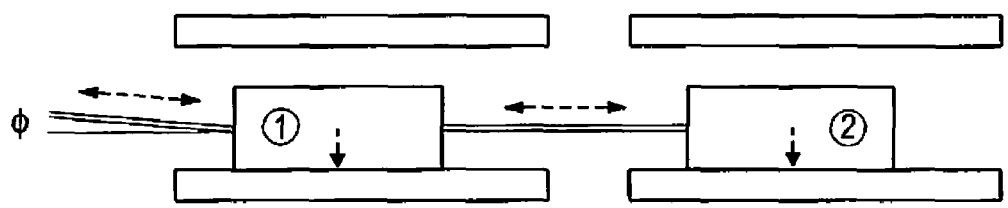

In FIG. 4c, slide 1 is now switched to the bottom race and the flexure portion 112a between slides 1 and 2 straightens out (no bending angle). In the process, slide 1 moves slightly forward (left) closer to the initial position of the load. At the same time, the flexure angle between the load and slide 1, switches from $+\phi$ to $-\phi$. Since $\cos(+\phi)=\cos(-\phi)$, the load moves precisely ahead (to the left) a distance equal to the movement of slide 1 in that direction. While slide 1 is switching from the top frame race to the bottom frame race, the load and slide 1 are prevented from moving backwards (to the right) by friction between slide 2 and the bottom race which holds slide 1 firmly in place.

Figure 4D:
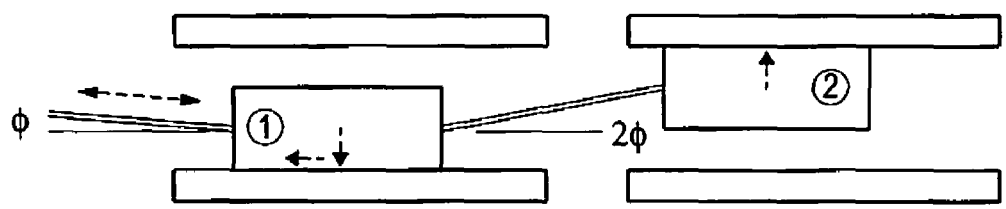

In FIG. 4d, slide 2 is switched from the bottom race to the top race and, again, the flexure between slides 1 and 2 is bent at an angle $2\phi$, and slide 2 moves slightly closer to slide 1 in the horizontal direction.

Figure 4E:
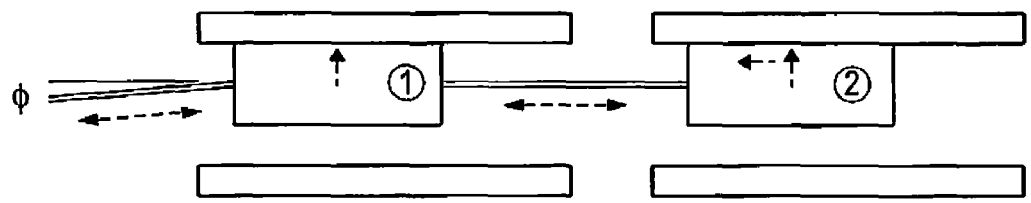

In FIG. 4e, slide 1 is switched from the bottom race to the top race and the flexure angle between slides 1 and 2 goes to zero (the flexure 112a straightens out). Again, the flexure angle between the load and slide 1 switches sign, from $+\phi$ to $-\phi$, and since $\cos(+\phi)=\cos(-\phi)$, the load moves precisely ahead (to the left) again a distance equal to the movement of slide 1 in this direction (horizontal). Again, while slide 1 is switching from the top frame race to the bottom frame race, the load is held from moving backwards (towards the right) by friction between slide 2 and the bottom race. Slide 1 moves slightly closer to the previous position of the load (to the left), and the load moves ahead with it.

This sequence of steps, referred to as forward "macro stepping" herein, can be repeated as many times as necessary to achieve a relatively long cumulative stroke forward stepping motion.

For reverse motion macro stepping, the actuator would be controlled to follow the same steps of FIG. 4, except in reverse order from FIG. 4e, that is, first the movement of FIG. 4d, then of FIG. 4c (resulting in a small step backwards—to the right), followed by the movements of FIGS. 4b and 4a, (resulting in another small step backwards) and a return to initial conditions with both slides 1 and 2 on the top races. This reverse sequence can be repeated as many times as necessary to provide cumulative backward (to the right) stepping a desired distance.

It is further noted that, as should be apparent from the above discussion, when the slides 1 and 2 are initially on the same respective side of the races, i.e., both on the top race or both the bottom race, and the slide 1 closest to the load is moved between races while the other slide 2 is held in position, this results in a change in horizontal position of slide 1 backwards (to the right). The load will likewise move a corresponding distance backward (to the right) in the horizontal direction. Therefore, a single macro step backwards (to the right) requires only the operation of FIGS. 4e-4d or 4c-4b, for example.

On the other hand, if the slides are initially on opposite sides of the races, movement of the slide 1 closest to the load will result in a change in the horizontal position in the forward (to the left) direction, and load will likewise move a corresponding distance forward (to the left) in the horizontal direction. Therefore, in this circumstance, a single macro step forward (to the left) requires only the operation of FIGS. 4b-4c, or FIGS. 4d-4e, for example.

According to the invention, the flexures bend precisely the same amount each time the slides are moved. Also, when one slide is being moved between races the other slide does not change position (slip or slide) on its race. Further, neither slide changes position on its race between steps. Therefore, the individual steps are very precise, and repeatable.

An advantage of the invention is that the actuator holds position with power off. In the above-described embodiment, permanent magnets are used in the slides. Since permanent magnet systems are inherently unstable, and since they are essentially flux sources that can easily exert relatively large magnetic forces across relatively large gaps, each slide containing permanent magnets will come to rest against a frame race, and will hold position securely with power off.

Basic stepping motion supporting calculations are provided below in association with the flexure bending illustrated in FIG. 5.

Figure 5:
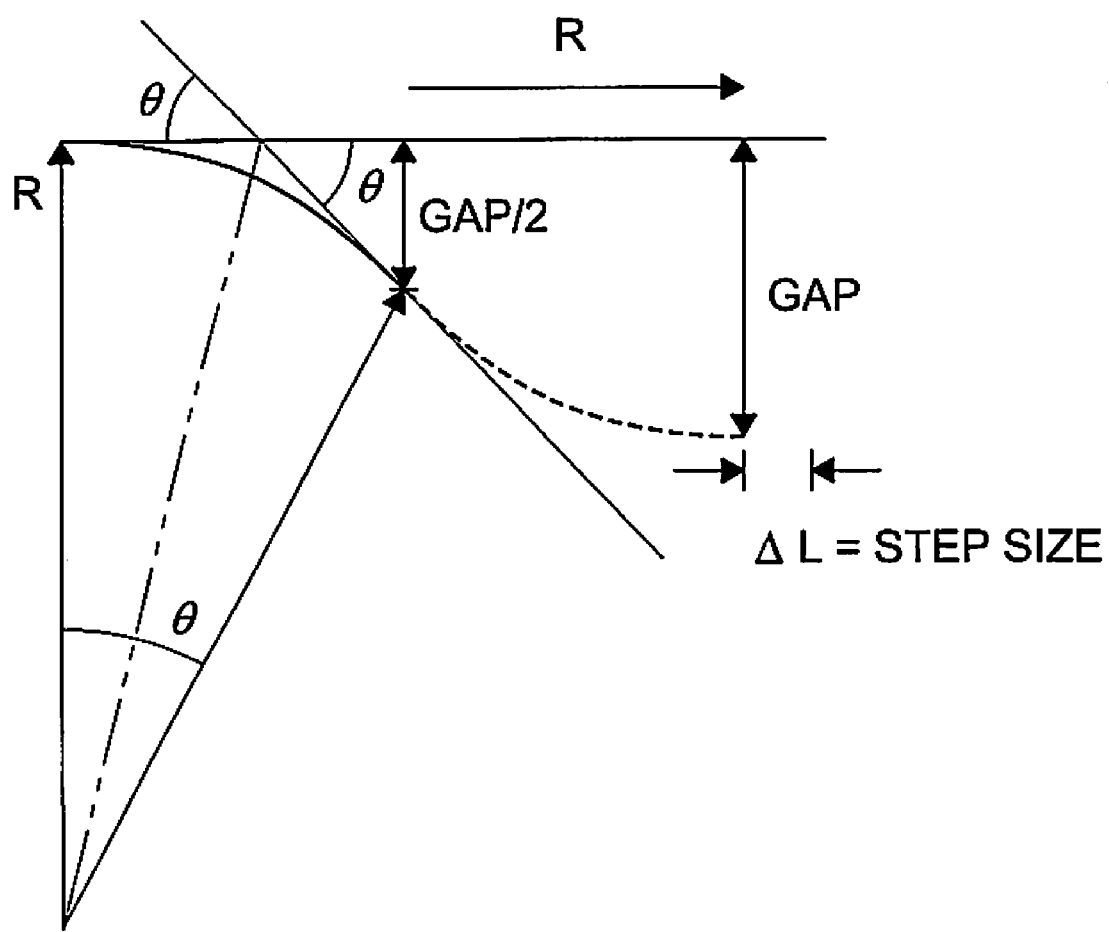
FIG. 5 illustrates basic step size as the amount the flexure shortens in the length-wise direction when bending.

From the flexure bending illustration of FIG. 5, where:
ΔL=Step Size
L=Flexure Length
θ=Flexure Maximum Bend Angle (at Null Point)
R=Radius of Flexure Arc The basic Step Size ΔL is the amount the Flexure shortens when it bends θ as shown in the flexure bending illustration of FIG. 5.

$$R\theta = \frac{L}{2} \quad (1.1)$$

At Flexure Null Point:

$$\frac{\Delta L}{2} = -\frac{L}{2} + R\mathrm{Sin}(\theta) \quad (1.2)$$

Substituting equation (1.1) into equation (1.2), we get:

$$\frac{\Delta L}{2} = -\frac{L}{2} + \left(\frac{L}{2}\right)\left(\frac{\mathrm{Sin}(\theta)}{\theta}\right) \quad (1.3)$$

Rearranging terms, $$\frac{\Delta L}{2} = -\frac{L}{2}\left(1 - \frac{\mathrm{Sin}(\theta)}{\theta}\right) \quad (1.4)$$

Which simplifies to:

$$\Delta L = -L\left(1 - \frac{\mathrm{Sin}(\theta)}{\theta}\right) \quad (1.5)$$

From Beer, Ferdinand P., and Johnston, Jr., E. Russell, Mechanics of Materials, Copyright 1981, McGraw-Hill, Inc., ISBN 0-07-004284-5 (Appendix D. page 598) we have:

$$\mathrm{Slope} = \mathrm{Tan}(\theta) = -\frac{PL^2}{2EI} \quad (1.6)$$

And $$\mathrm{Gap} = -\frac{PL^3}{3EI} \quad (1.7)$$

From the Flexure Bending Illustration of FIG. 5, and considering equations (1.6) and (1.7) immediately above, the Slope at the Flexure Null Point is:

$$\mathrm{Tan}(\theta) = -\frac{PL^2}{4}\left(\frac{1}{2EI}\right) \quad (1.8)$$

And:

$$\mathrm{Tan}(\theta) = -\frac{PL^2}{(4)}\frac{1}{2EI}; \frac{\mathrm{Gap}}{2} = -\frac{PL^3(1)}{8(3)EI} \quad (1.9)$$

Or, in an equivalent form:

$$\mathrm{Tan}(\theta) = \left(-\frac{PL^3}{4}\frac{1}{3EI}\right)\frac{1}{L}\left(\frac{3}{2}\right) \quad (1.10)$$

Leading to:

$$\mathrm{Tan}(\theta) = -\mathrm{Gap}\left(\frac{3}{2L}\right) \quad (1.11)$$

THUS:

For a given Gap and a given Flexure Length, L, we calculate θ.

For a given θ and the given L, we calculate ΔL (Step Size).

EXAMPLE

Let: L=5/16 in.; Gap=0.003 in.

$$\mathrm{Tan}(\theta) = -\frac{3(0.003 \text{ in.})}{2\left(\frac{5}{16} \text{ in.}\right)} = -1.440000(E-2)$$

θ=8.250022 (E-1) deg. Or 1.439900 (E-2) Radians $$\Delta L = -\left(\frac{5}{16} \text{ in.}\right)\left(1 - \frac{\mathrm{Sin}(\theta)}{\theta}\right) = -10.79991(E-6 \text{ in.})$$

ΔL/0.4 (E-6) in.=no. of microsteps required=27.

Flexure drive mechanical advantage will now be mathematically examined.

$$\frac{d(\mathrm{Gap})}{d(\Delta L)} = MA \quad (2.1)$$

$$\frac{\frac{d(\mathrm{Gap})}{d\theta}}{\frac{d(\Delta L)}{d\theta}} = MA \quad (2.2)$$

$$\mathrm{Tan}(\theta) = -\frac{3(\mathrm{Gap})}{2L} \quad (2.3)$$

$$\Delta L = -L\left(1 - \frac{\mathrm{Sin}(\theta)}{\theta}\right) \quad (2.4)$$

-continued $$\frac{Gap}{\Delta L} = \frac{-\frac{2}{3}L\frac{\sin(\theta)}{\cos(\theta)}(\theta)}{-L(\theta - \sin(\theta))} \quad (2.5)$$

$$= \frac{2(\theta)\sin(\theta)}{3(\theta\cos(\theta) - \sin(\theta)\cos(\theta))}$$

$$\frac{d(num)}{d(\theta)} = 2(\sin(\theta) + \theta\cos(\theta)) \quad (2.6)$$

$$\frac{d(denom)}{d(\theta)} = 3(\cos(\theta) - \theta\sin(\theta) - \cos^2(\theta) + \sin^2(\theta)) \quad (2.7)$$

$$\frac{\frac{d(num)}{d(\theta)}}{\frac{d(denom)}{d(\theta)}} = \frac{0}{0}; \text{ as } \theta \to 0 \quad (2.8)$$

$$\frac{d^2(num)}{d^2(\theta)} = 2(\cos(\theta) + \cos(\theta) - \theta\sin(\theta)) \quad (2.9)$$

$$= 2(2\cos(\theta) - \theta\sin(\theta))$$

$$\frac{d^2(denom)}{d^2(\theta)} = 3\begin{bmatrix} -\sin(\theta) - \sin(\theta) - \theta\cos(\theta) + \\ 2\cos(\theta)\sin(\theta) + 2\sin(\theta)\cos(\theta) \end{bmatrix} \quad (2.10)$$

$$= 3[-2\sin(\theta) - \theta\cos(\theta) + 4\sin(\theta)\cos(\theta)]$$

$$\frac{\frac{d^2(num)}{d^2(\theta)}}{\frac{d^2(denom)}{d^2(\theta)}} = MA(\theta) \quad (2.11)$$

$$= \left(\frac{2}{3}\right)\frac{[2\cos(\theta) - \theta\sin(\theta)]}{[4\sin(\theta)\cos(\theta) - 2\sin(\theta) - \theta\cos(\theta)]}$$

$$\text{As } \theta \to 0; \; MA(\theta) = \frac{4}{3}\left(\frac{1}{0}\right) \to \infty$$

EXAMPLE

From Example in Step Size Calculations above $\theta$=8.250022 (E-1) deg. Or 1.439900 (E-2) rad. (Worst Case Situation)
L=5/16 in.
MA=(2/3) [1.999585/1.439354 (E-2)]=92.61495

Note: actuator is limited by Frictional Holding Force. Its' Drive is always stronger than its holding force.

Holding Force (see, Hayt, William h. Jr., Engineering Electromagnetics, Fourth Edition, Copyright 1981, McGraw-Hill, Inc., ISBN 0-07-027395-2 (p. p. 327 Magnetic Force equation).

$$F = \frac{1}{2}\frac{B^2 S}{\mu_0}; \text{ Say } B = 1 \; Telsa; \; S = \left(\frac{1}{2} \text{ in.}\right) \times \left(\frac{1}{16} \text{ in.}\right) \times 2 \quad (3.1)$$

(Note: Area dimensions in equation 3.1, are taken from FIG. 1 example).

$$F = \frac{1}{2}\frac{(1^2)\left(\frac{1}{2}\right)\left(\frac{1}{16}\right)(2)}{(4\pi)(E-7)(40)(40)} \quad (3.2)$$

$$= \frac{2(E7)}{(64)4\pi(1600)}$$

Resulting in normal forces:

$$F = 15.54247N \quad (3.3)$$

$$= 3.491040 \text{ lbf.}$$

Which, in turn, leads to holding (friction) forces:

$$\mu_S=1; \text{ FF}=3.491040 \text{ lbf.} \quad (3.4)$$

$$\mu_S=0.5; \text{ FF}=1.745520 \text{ lbf.}$$

Using high performance magnetic materials (such as Hiperco 50A), B=1.6 Tesla can be used. Using this material in equations (3.1) (3.2) above, we get:

$$B = 1.6; \quad (3.5)$$

$$F = 39.78874N$$

$$= 8.944906 \text{ lbf.}$$

Resulting in:

$$\mu_S=1; \; F_F=8.944906 \text{ lbf.} \quad (3.6)$$

$$\mu_S=0.5; \; F_F=4.972453 \text{ lbf.}$$

Flexure Parasitic Bending Force Losses:

$$\frac{\Delta}{2} = -\frac{PL^3}{3EI} \; [1] \quad (4.1)$$

$$0.0015 \text{ in.} = -\frac{P\left(\frac{5}{32}\right)^3}{(3)(10E6)\left(\frac{1}{12}\right)\left(\frac{5}{8}\right)(0.010)^3}; \quad (4.2)$$

$$P = 0.6144000 \text{ lbf}$$

Flexure Buckling (see pp. 531-535, Beer, Ferdinand P., and Johnston, Jr., E. Russell, Mechanics of Materials, Copyright 1981, McGraw-Hill, Inc., ISBN 0-07-004284-5):

$$P_{CR} = \frac{\pi^2 EI}{L_E^2} \quad (5.3)$$

$$\sigma_{CR} = \frac{\pi^2 E}{(L_E/R)^2} \geq \frac{P}{A} \quad (5.4)$$

$$\frac{L_E}{R} = \text{Effective Slenderness Ratio} \quad (5.5)$$

$$R^2 = \frac{\left(\frac{1}{12}\right)\left(\frac{5}{8}\right)(0.010)^3}{\left(\frac{5}{8}\right)(0.010)}; \; R = 2.886751(E-3) \text{ in.} \quad (5.6)$$

$$I = AR^2 = \frac{1}{12}bh^3 \quad (5.7)$$

E=10 (E6) psi (aluminum); 37 (E3) psi=yield strength(6061-T-6 aluminum)

$$I = \frac{1}{12}\left(\frac{5}{8}\right)(0.010)^3 \qquad (5.8)$$
$$= 5.208333(E-8)(\text{in.})^4;$$

$$\frac{L_E}{R} = \frac{\left(\frac{5}{16}\right)}{2.886751(E-3)}$$
$$= 108.2532$$

$$P_{CR} = 52.63789 \text{ lbf}; \qquad (5.9), (5.10)$$
$$\sigma_{CR} = 8.422059 \text{ Ksi (allowable)}$$
$$\frac{P}{A} = \frac{10 \text{ lbf}}{\left(\frac{5}{8}\right)(0.010)}$$
$$= 1.6 \text{ Ksi max(expected with 2/1 safety factor)}$$

Current requirement calculations (see: Product Description Brochure by Carpenter Technology Corporation, Carpenter Steel Division, U.S. Service Center 1-800-654-6543. Hiperco Alloy 50A qualities and characteristics are described in this Brochure starting on Electronic Alloys 7; Hayt, William H. Jr., Engineering Electromagnetics, Fourth Edition, Copyright 1981, McGraw-Hill, Inc., ISBN 0-07-027395-2 (p. 252 Solenoid equation, and p. 327 Magnetic Force equation).

$$B = \mu_0 \mu_R \frac{NI}{L} \text{(Solenoid Equation)} \qquad (6.1)$$
Choose:

$$\mu_R = 10,000 (Hiperco\ 50A) \qquad (6.2)$$
$$\mu_0 = 4\pi(E-7)$$
$$B = 1.6\ Telsa$$
$$L(\text{Coil Length}) = \frac{2.5 \text{ meters (from fig. 1 Sketch)}}{(4)(40)}$$

$$1.6 = \frac{4\pi(E-7)(10,000)NI}{\frac{2.5}{160}} \qquad (6.3)$$

$$NI = 1.989437 \text{ Ampere Turns} \qquad (6.4)$$
Choose wire diameter = 0.030 in., $$\frac{2.5}{(4)(0.030)} = 20.83333 \text{ Turns; Say } 20 \qquad (6.5)$$

$$I = \frac{1.989437}{20} \qquad (6.6)$$
$$\cong 100 \text{ milliamps}$$

Micro-stepping according to an embodiment of the invention will now be described. For ultra-precision positioning, micro-stepping can be done within each of the (already precise) macro step sizes described above with reference to FIGS. 4a-e. There are many ways to perform micro-stepping with stepping flexures according to the invention, and this brief discussion is limited to introducing the subject and describing two micro-stepping techniques. One of these techniques described below is passive and the other active.

Passive Micro-Stepping will be discussed first. Referring to FIG. 4a, the top-most diagram, it is noted that both slides 1 and 2 are fixed to the top race, the flexure 112a connecting them is straight, and the flexure 112b connecting the load to the nearest slide 1 is nearly straight (less than 1 degree).

As noted in the example above (after equations 1.1 to 1.11), a full step is on the order of 12 (E-6) inches and we are attempting to micro-step to 0.4 (E-6) in. resolution. The passive technique operates by, for example, stepping 1 step too far, and then perform a single micro-step backwards by precisely, both in amount and in time duration, reducing the friction between each of the slides 1 and 2 and their races, thereby letting the load push the two slides back an infinitesimal, but precise and repeatable amount. At the end of this micro-step time duration, the slides 1 and 2 will return to being fixed to the top races, albeit one micro-step back.

This process can be repeated until an ultra-precision position is achieved. The precision and resolution of this technique depends on: (1) the load pushing back as a linear spring throughout the micro-stepping range; (2) the friction being controlled precisely; and (3) the time duration of the micro-step being controlled precisely.

Regarding (1), with total travel of 12 (E-6), routine contact between actuator and load has an equivalent spring interface that is linear across this minuscule range. In addition, there are already known force actuators, such as those used by NASA, that have a precision spring interface with their load that is deliberately designed to provide this precision spring interface many times more than the 12 (E-6) inch micro-stepping range.

Regarding (2), the coils in the races can be actuated so as to make the slides just barely adhere to their races. This, in turn, reduces the normal forces (and the friction) to a tiny amount. The slides are, in effect, semi-magnetic bearings and slide very easily and predictably. The variations in the static coefficient of friction are inconsequential.

Regarding (3), the time duration of this semi-magnetic bearing action is very precise, repeatable and has great resolution, especially in view of the small coil inductances involved.

Active Micro-Stepping will now be discussed with reference to FIG. 4b, the diagram, which is second from the top. In FIG. 4b, slide 1 is stuck to the top race and slide 2 is stuck to the bottom race. If slide 2 is now placed into a semi-levitation mode, and slide 1 is driven down towards the bottom race, slide 2 is driven backwards. However, this is only done for a fraction of a second, the duration of a micro-step, as the semi-levitation condition of slide 2 is quickly stopped by controlling its race coil current. Meanwhile, slide 1 continues to the bottom race and then is immediately sent back to the top race, where the situation shown in FIG. 4b, second diagram from the top is resumed, except that the slides and the load have relocated 1 micro-step to the left. This process can be repeated as many times as necessary to achieve a desired position with respect to initial positions.

In summary, the above-described embodiment of the invention is a general stepping flexure configuration, comprising two bi-stable contact elements or slides, bi-stable in the sense that each can assume a position either up or down as shown in FIGS. 4. The above-described general magnetic stepping flexure configuration includes the two bi-stable contact elements, which each preferably comprise permanent magnets with soft ferromagnetic keepers. These permanent magnet "pistons" are positioned, one behind the other with respect to a load, and are joined to each other by at least one tape-like flexible member. The permanent magnet contact elements are, in turn, positioned behind a load with the magnetic contact element nearest the load being joined to that load by a second flexure portion and attached to that load at a point mid-way between the races of a frame. This is in contrast to so-called "inch worm" actuators which have two clamping members and an expansion/drive member. These permanent magnet contact elements, with flexures, are also positioned inside the frame which performs the dual functions of: (1)

providing the magnetic circuits which direct the movements of the permanent magnets; and (2) providing the race/housing which physically constrains/positions the actuator moving members.

Also described above were basic stepping flexure locomotion/movement techniques, involving sequenced up and down motion of the bi-stable contact elements, which results in precision one way direction of movement of the load and of the actuator. The at least one flexible member (flexure) joining the contact elements to each other serves to both convert the sequenced up and down motions of the contact elements into one way directional movement of the load with precise, highly repeatable step sizes, and also serves to provide drive force multiplication (mechanical advantage). The bi-stable contact elements or "pistons" both power the flexures and provide the necessary holding/reaction force, i.e., the friction between frame and contact elements. By contrast, in a so-called "inch worm" actuator, clamps provide the holding forces and a separate drive/extender provides the drive. The coils inside the frame control the movements of magnetic contact elements.

Regarding movement of the load, macro and micro stepping were described. Passive and active micro-stepping of the flexure actuators both involve using precision control of actuator friction hold (semi-levitation) to provide micro stepping.

It will be apparent to one skilled in the art that the manner of making and using the claimed invention has been adequately disclosed in the above-written description of the preferred embodiment taken together with the drawings.

It will be understood that the above described preferred embodiment of the present invention are susceptible to various modifications, changes, and adaptations, and the same are intended to be comprehended within the meaning and range of equivalents of the appended claims.

Some alternate embodiments will now be described. Alternate flexure embodiments will be described first, followed by a description of alternate actuator configurations. This, in turn, will be followed by a series of flexure-only actuators (where at least the magnets are stationary) and a series of thin magnet circuits. Then three element stepping flexures operation, in particular, a macro stepping sequence, is described.

Alternate flexure preferred embodiments are illustrated in FIGS. 6a-e and 7a-d. This discussion will be divided into two parts, one discussing unbent flexures and one describing bent flexures. First a discussion of unbent flexures. These alternate flexure embodiments are intended to provide easy flexing while being very strong in buckling.

FIGS. 6a-e show side views of a series of alternate embodiments in which the flexures are "normally" unbent, i.e. they are parallel with the magnet surfaces when the stepping flexure mechanism is in a relaxed condition.

Figure 6A:
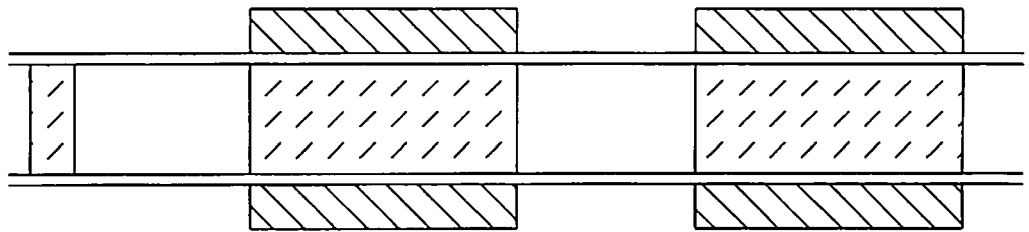
FIGS. 6a-6e illustrate several flexure alternative arrangements of flexures according to alternative embodiments of the invention, in particular.
Figure 6B:
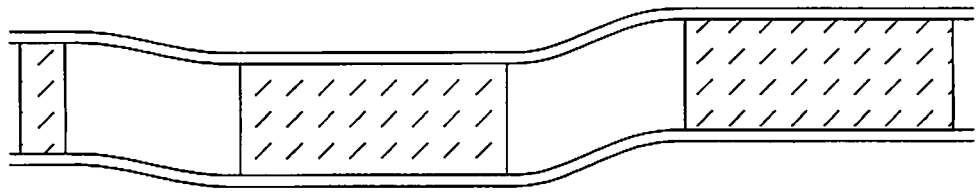

FIG. 6a shows a first alternative embodiment in its relaxed condition and FIG. 6b shows this alternative embodiment in action (flexures bending) in its race, in particular, with the right-most magnetic element stuck to the top of the race, the left-most magnetic element stuck to the bottom of the race, and the load located midway between the top and bottom of the race at the far left of the drawings.

In FIGS. 6a and 6b, two parallel flexures are used, one on top of the magnets and one below the magnets. Both flexures bend in an S-shaped curve, as described in the analysis above, and the step size is the same as described above for the primary embodiment. However, this flexure arrangement may be simpler and less expensive to construct than the primary embodiment. This alternative may also have the added advantage of constraining the magnetic elements so that they hit and leave the race surfaces with no tilting angle and, hence, minimal frictional scrubbing losses and repeatability errors. On the other hand, since two flexures are involved, either the parasitic force losses are doubled, or the size (thickness or width or length) of the flexures must be adjusted.

Figure 6C:
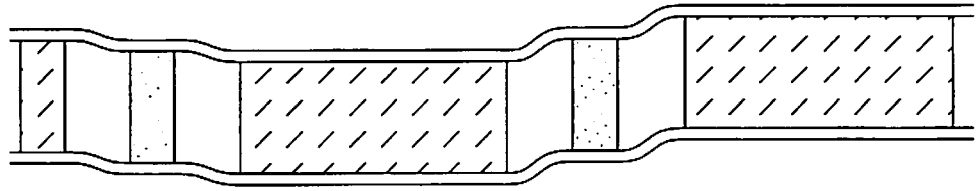

FIG. 6c shows a ladder flexure in action (bending). In this alternative embodiment, the flexure thickness can be reduced to compensate and even improve parasitic bending forces with no loss of strength in buckling. The bending configuration shows two sets of S-shaped curves, above and below each other, separated by the ladder rung. This arrangement is compliant in parasitic bending, but tough and rigid in compression and buckling.

Figure 6D:
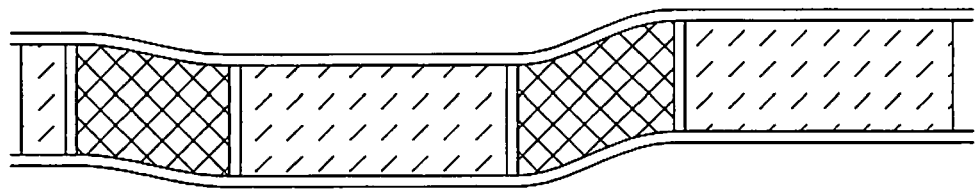

FIG. 6d shows the "ladder rung" of the alternative embodiment in FIG. 6c, replaced by a composite substance (labeled "COMP") that is relatively compliant in bending and in shear deformation. However, the composite material is attached to the flexures with an adhesive such that the parallel flexures are constrained in buckling. As the area of the flexure-composite material attachment is very large, the composite material can be relatively soft in compression and tension and still prevent buckling. An example of a suitable composite material is a carbon fiber composite.

Figure 6E:
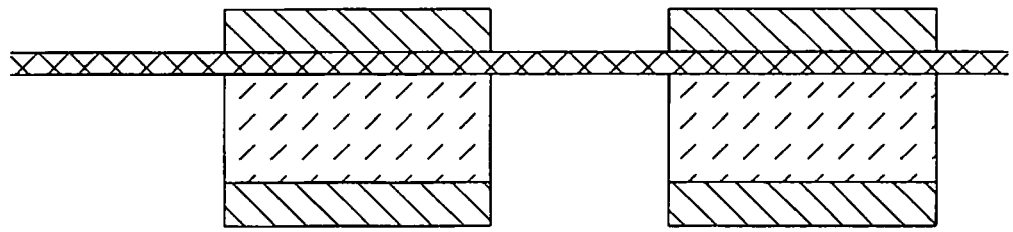

FIG. 6e shows a pair of parallel flexures, but both are positioned over the top of the magnet and the load. This alternate embodiment arrangement performs like the primary embodiment. However, this alternative embodiment may be less expensive. Although FIG. 6e shows the two parallel flexures with a composite material in between, alternatively the flexure could be comprised of a ladder configuration, i.e. parallel flexures with a rung instead of the composite material as in FIG. 6c. Another alternative is a single tape flexure, such as in the primary embodiment. This alternative embodiment is, essentially, the primary embodiment with an offset of the flexure to the top of the magnetic elements. When two parallel flexures are used, both would preferably be fixed to each of the magnets and to the load. Of course, it should be apparent to one skilled in the art that more than two parallel flexures could be used, and such a modification is considered to be within the scope and spirit of the invention.

Bent flexures arrangements are illustrated in FIGS. 7a-c, while FIG. 7d achieves the "bent" effect by using two sets of parallel flexure segments, the sets being offset by respective ladder rungs between the magnetic contact elements. The general purpose of using these bent flexure arrangements is to achieve an increase in stroke length and actuator speed. This, of course, means reduced drive force and reduced precision positioning as tradeoffs. Since holding force is the limiting factor, the practical tradeoffs are between speed and precision. The increase in step size is dramatic, e.g. one or more orders of magnitude, depending on offset angle, and is roughly defined by the following equation:

$$\left[\left(\frac{\text{Gap}}{2}\right)\left(\frac{L}{2}\right)(\text{Tan(off set angle)}2] + \Delta L \text{Cos(off set angle)}\right.$$

The arrangements in FIGS. 7a-c parallel their counterparts in FIGS. 6a-c, except with an offset angle (a bend) when inactive. FIG. 7d is a variation of FIG. 7a, in which an offset pair of parallel flexures is approximated by the arrangement shown in FIG. 7d to simplify eventual MEMS (micro electromechanical systems) construction.

In these bent flexure alternative embodiments of FIGS. 7, the offset angle may tend to make the flexures somewhat more vulnerable to buckling. However, this danger is mitigated by keeping the offset angle minimized by the natural bending constraints imposed by the small gaps used, e.g. on the order of 0.003 inches, and by the tendency of the magnets to fail in holding long before buckling forces assert themselves.

A "side winder" stepping flexures alternative embodiment is illustrated in FIGS. 8a-d, and will now be described. This arrangement is, essentially, similar to the primary embodiment illustrated in FIGS. 1, 2, and 3, but having the coil windings, the magnets and keepers rotated 90 degrees with respect to the sides of the frame. In the primary embodiment, each coil axis extended across the frame, i.e. perpendicular to the direction of movement of the load, whereas in this alternative embodiment, each coil axis extends in the direction down the frame, i.e. parallel to the direction of movement of the load. This may have an advantage of simplified construction, and may be easier to make compact, which can be advantageous in applications where stroke is limited, and where small size and large force to size ratios are desired.

Figure 9A:
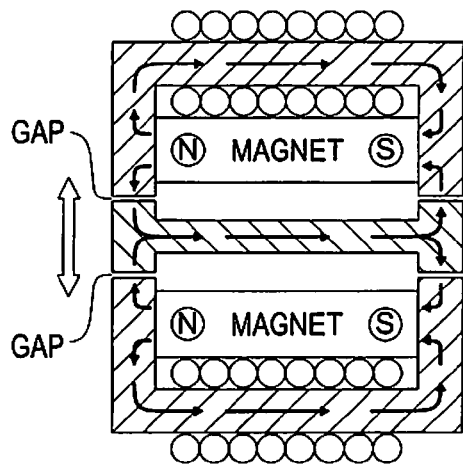
FIGS. 9a-d illustrate "flexures only" alternative embodiments of the invention, in particular.
Figure 9B:
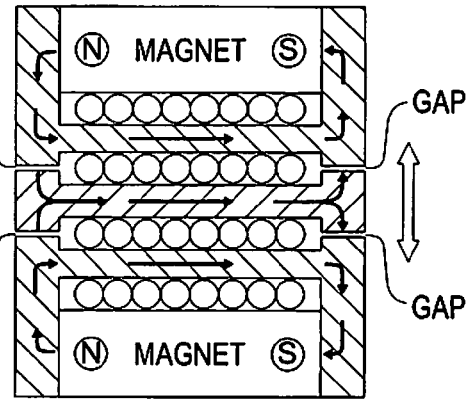
Figure 9C:
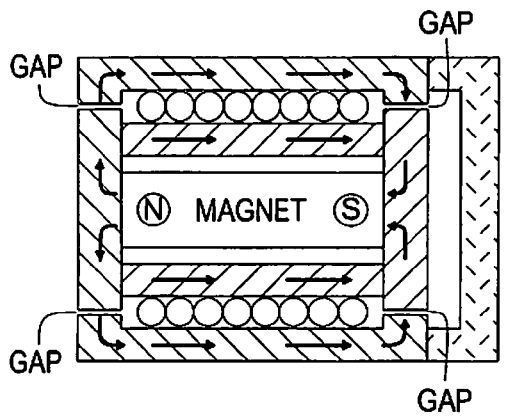
Figure 9D:
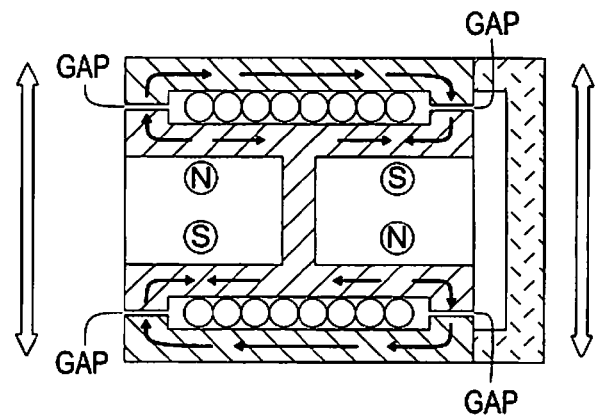
Figure 10:
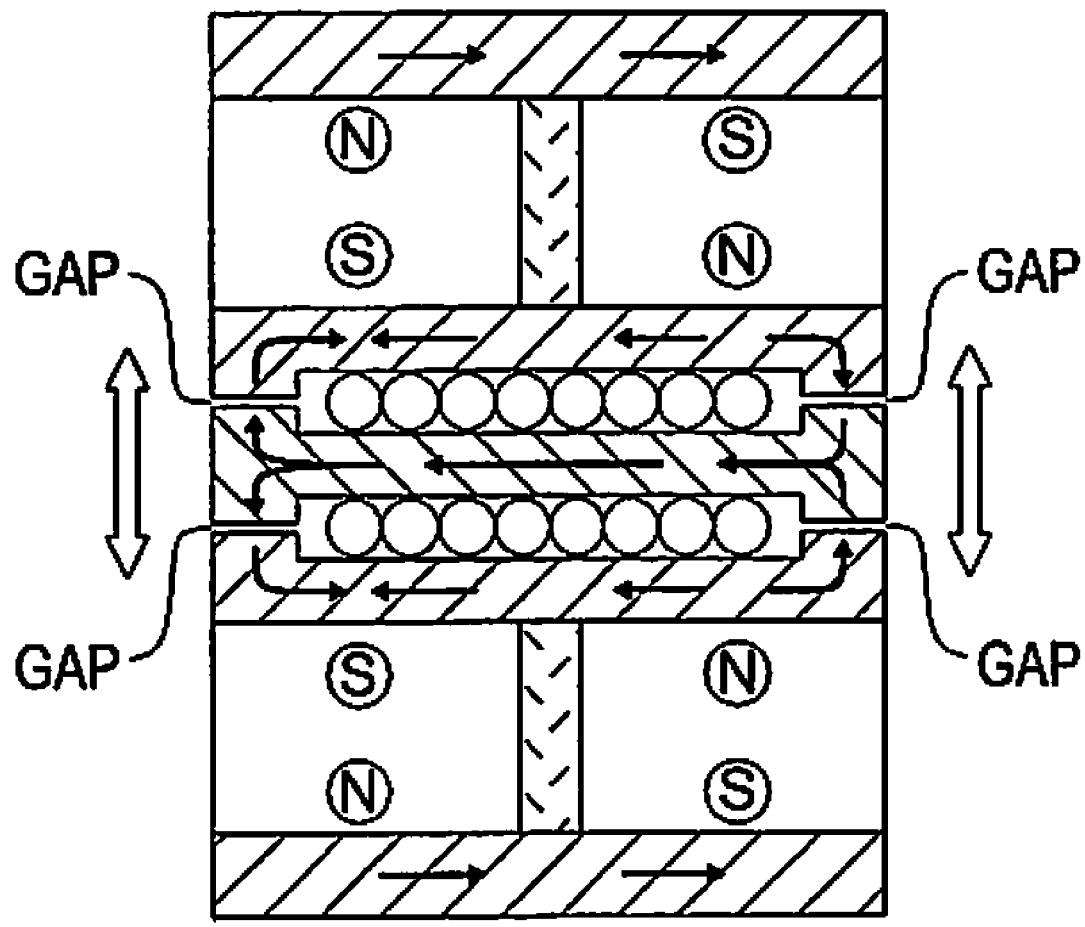
FIG. 10 illustrates another "flexure only" actuator according to an alternative embodiment of the invention having split magnets and a single element.

Flexure-only actuators are illustrated in FIGS. 9 and 10, and will now be discussed. The common theme in this family of stepping flexures is that the permanent magnets and/or (ideally) the coils, do not move. Rather, the stepping flexures in these arrangements move (when a magnetic circuit is changed) in order to provide a path for completing the magnetic circuit, as will be explained below. These arrangements have the advantages of simplicity, compactness and high stepping rate (due to low mass and inertia) and are advantageously employed where these characteristics are desirable. The arrangements in FIGS. 9 may be rotary or linear elements, depending on how the coils are arranged.

FIG. 9a shows a two coil, two magnet, simple moving flexure element arrangement. In this arrangement, it can be seen that the magnets are not disposed in the moving part of the actuator, but are disposed above and below the moving part. If the flux bypass on the top magnet is blocked by activation of its electromagnetic coil, the flexure only element in the center of the figure will move upwards to contact the upper race surface to provide the flux from the upper magnet a path to complete its magnetic circuit. This accomplished, the upper coil can be turned off and the flexure only element will remain firmly in place against the upper race surface. This is because of remnance forces in the upper coil core opposing upper magnet flux, as opposed to remnance forces in the flexure only element supporting upper magnet fluxes. Throughout this process, the lower magnet is neutral because its flux bypass is occupying its magnetic flux. When the lower magnet's coil is activated, the lower magnet flux circuit is blocked and it looks to complete its magnetic circuit by attracting the flexure only element in the middle of the figure downward. This, in turn, forces the flux from the upper magnet away from the flexure-only element and through its upper coil core, resetting its magnetic dipole remnance to support the upper coil flux. In this way, switching the coils can move the flexure-only element up and down.

FIG. 9b is a variation of FIG. 9a, and may be used in linear actuators, where the coils are wound as top and bottom coils under the respective magnet, and above the flexure-only element. The FIG. 9b embodiment may also be used in rotary actuators, where the coils are a set of top and a set of bottom pancake coils, that is, where each coil of the sets is wound pancake fashion, into and out of the page under the respective magnet, and above the flexure only element.

FIG. 9c varies the arrangement of FIG. 9b by wrapping the flexure element around a single magnet, resulting in one magnet rather than two, albeit at the price of complicating the flexure-only element.

FIG. 9d extends the arrangement of FIG. 9c by using two split magnets. This allows thin magnets to be used to perform with a force comparable to thick magnets.

FIG. 10 varies the arrangement of FIG. 9d to simplify the flexure element but, at the price of complicating the magnet and flux bypass arrangement. Here split magnets are used above and below the flexure-only moving element, with respective pancake coils sandwiched between its respective magnet and the flexure-only moving element. If current is applied to the bottom coil in the direction out of the page, the element goes down and sticks.

Thin magnet circuit alternative embodiments will now be discussed, with reference to thin magnet circuits illustrated in FIGS. 11a-c, and split thin magnet circuits illustrated in FIGS. 12 and 13.

Figure 11A:
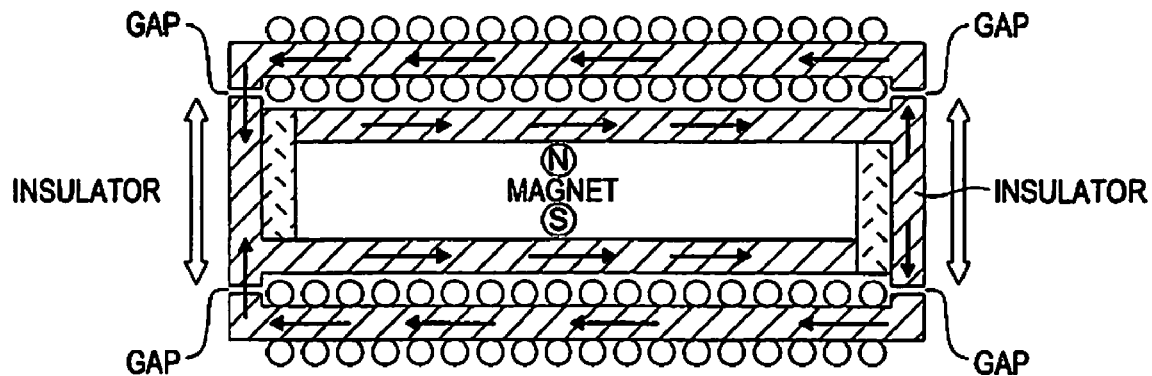
FIGS. 11a-c illustrate thin magnetic circuit alternative embodiments according to the invention, in particular.

FIG. 11a shows a single thin magnet arrangement with wrap-around keepers. As shown in FIG. 11a, the flux from the magnet north pole travels from left to right towards one of two escape gaps (top and bottom on the right). If the upper coil blocks the upper flux return, the flux will travel down the right hand side wrap-around, jump the lower right hand gap, travel from right to left through the lower flux return, across the lower left hand gap, and from left to right along the magnet south pole where it completes the magnetic circuit. With the flux jumping across the two lower gaps, the magnet is pulled down. When the lower flux return is blocked the flux jumps across the upper two gaps and the magnet is pulled up. Insulators, as shown, are disposed at both sides of the magnet.

Figure 11B:
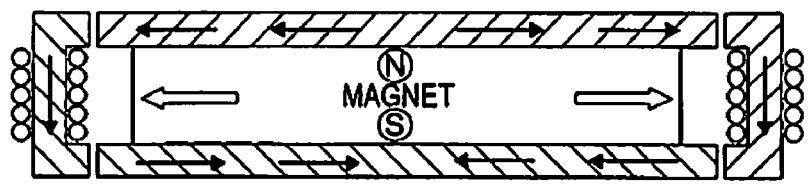

In the arrangement according to FIG. 11b, no wrap-around keepers are used. In this arrangement, flux returns, and their coils, and gaps, are on the left and right hand sides of the figure. Accordingly, the magnet motion is to the left or to the right.

Figure 11C:
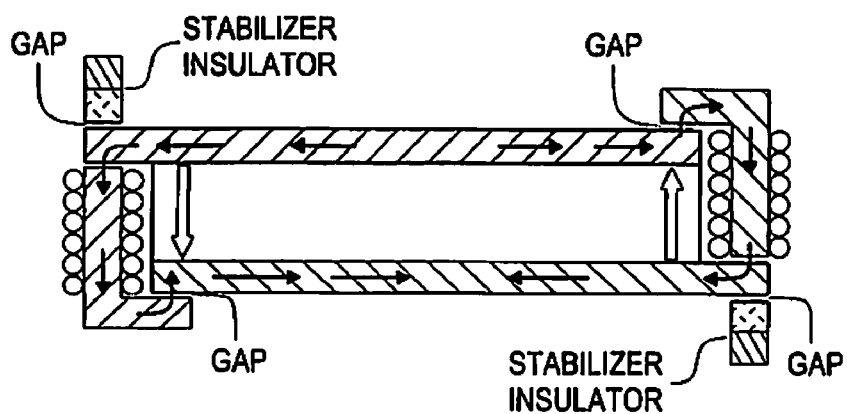

FIG. 11c shows an arrangement having asymmetric keepers, essentially a combination of FIGS. 11a and 11b, in which the magnet can be selectively driven up or down. In this configuration, the two gaps and their forces are either both on the left (magnet up) or both on the right (magnet down). In instances where this force arrangement makes the actuator kinematics unstable, flux insulator elements can be added as shown in the figure in the upper left and the lower right. Another way to correct this is addressed in FIGS. 12, using split thin magnet circuits.

Figure 12A:
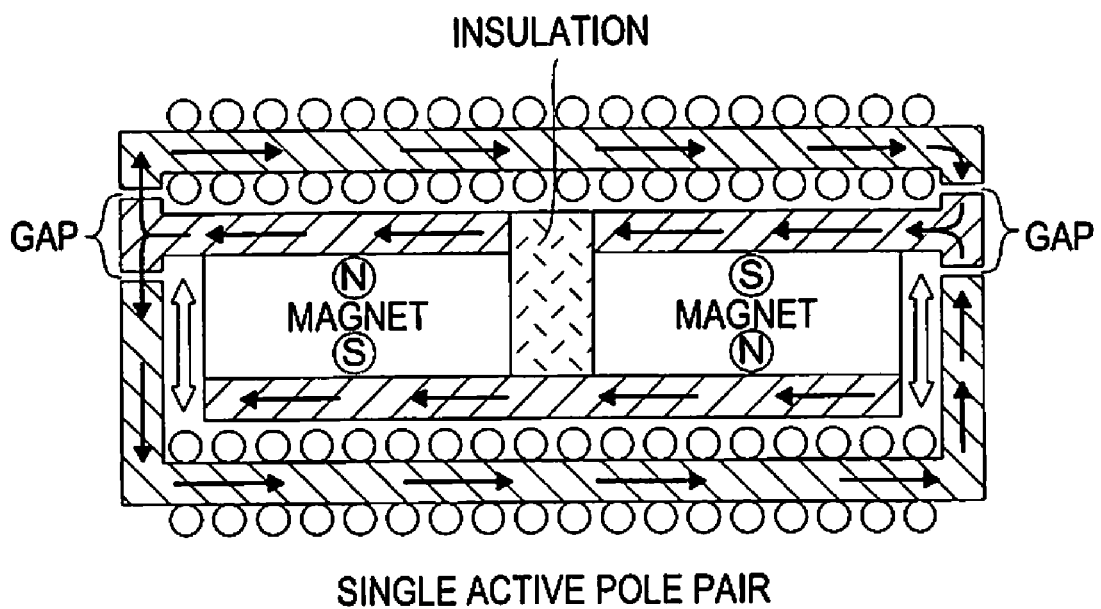
FIGS. 12a-b illustrate split thin magnet circuit alternative embodiments according to the invention, in particular.

FIG. 12a illustrates an arrangement having a single active pole pair. This arrangement uses wrap-around lower flux returns, along with split thin magnets, to emulate the actions and performance of the FIG. 1 primary embodiment, but with what may be cheaper and simpler thin magnets.

Figure 12B:
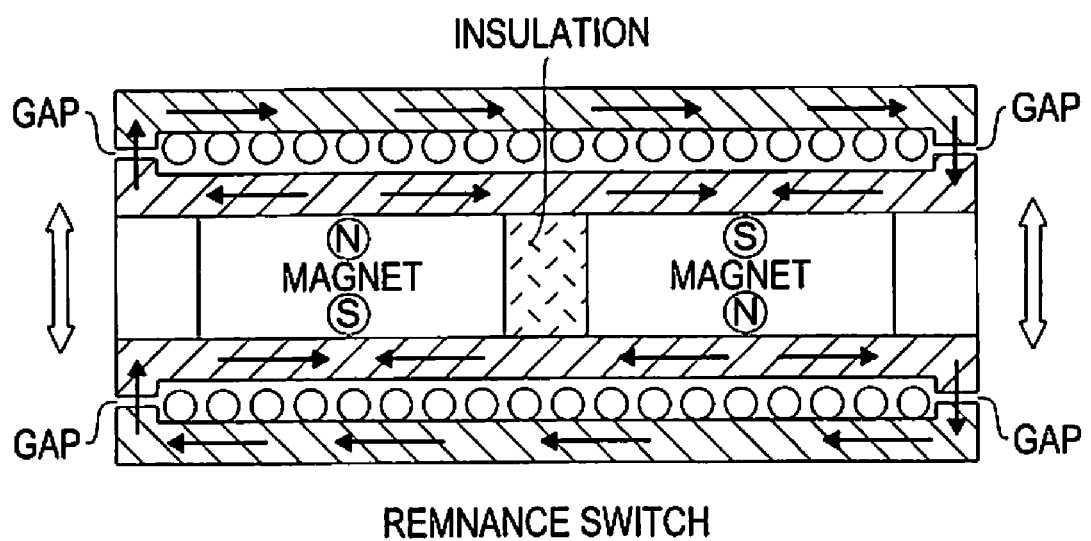

FIG. 12b illustrates an arrangement referred to as a remnance switch. In this arrangement, the wrap-around lower flux return is replaced with a simpler version, but depends on utilizing the remnance in the flux return cores, and the keepers joining the poles of the thin magnets together. As explained in the notes of FIG. 12b, this arrangement constitutes a magnetic remnance switch, and a single coil can be wrapped around the magnets in a side winder linear actuator configuration. Alternatively, two separate rotary pancake configured coils can be used for rotary actuator implementations.

Figure 13:
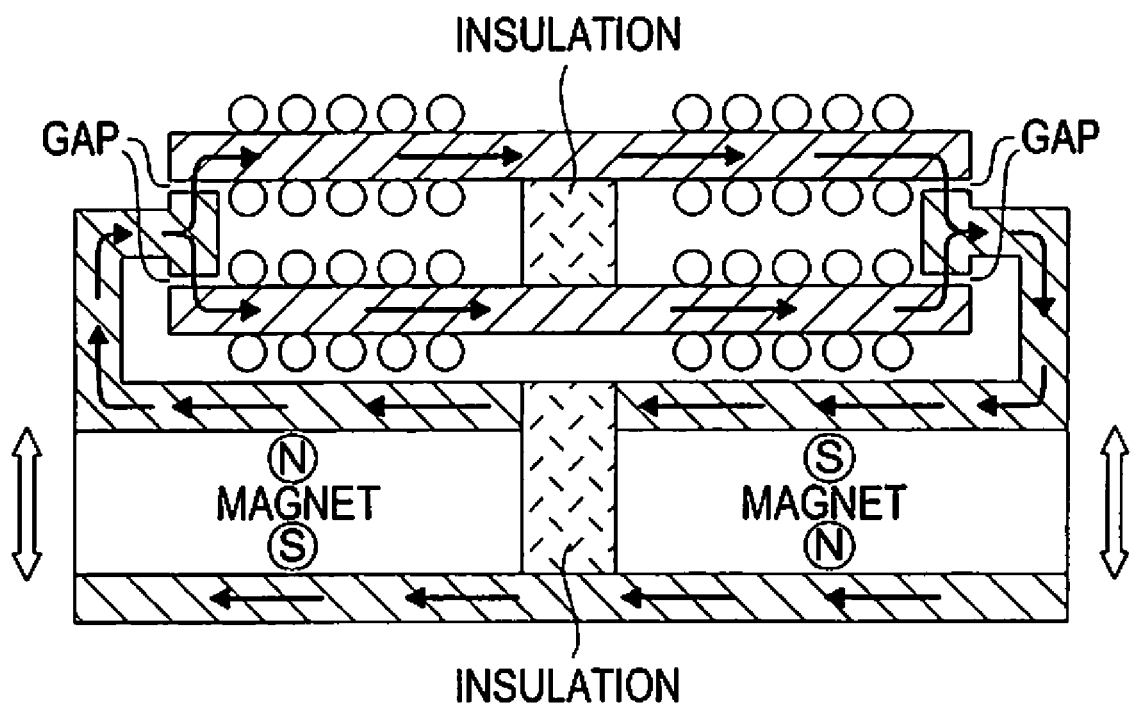
FIG. 13 illustrates another split thin magnet circuit embodiment according to the invention, in particular, a single split flux return circuit embodiment.

FIG. 13 illustrates a split thin magnetic circuit arrangement with a single split flux return circuit in combination with split thin magnets. This makes possible another version of flexure-only actuators, albeit with the coils wrapped around the flexures, as shown. This alternative may be useful for limited stroke actuator implementations.

The primary embodiment is illustrated as an actuator having two stepping elements. However, the invention is not limited to this particular number of stepping elements. There may be applications where it would be preferable to have more than two stepping elements, for example three elements. The particular configuration of these elements could be as described in any of the embodiments above and their alternatives. An exemplary operation of a three element stepping flexure actuator will be described below.

FIG. 14 shows a stepping sequence for a three element stepping flexure actuator according to an embodiment of the invention. There may be numerous ways to step a three element stepping flexure according to the invention, as would be apparent to one skilled in the art, one of which is illustrated and described herein with respect to FIG. 14.

Figure 14A:
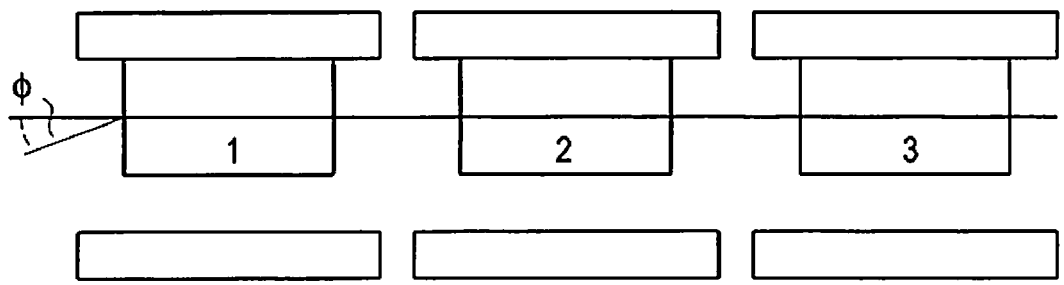
FIG. 14 illustrates the stepping sequence for a three element alternative embodiment according to the invention.
Figure 14B:
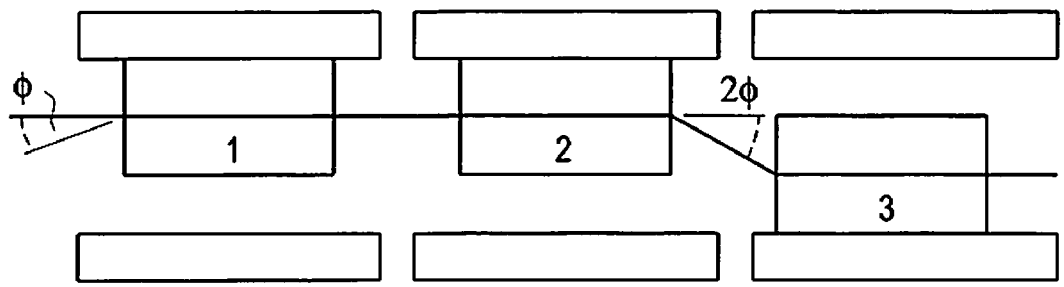
Figure 14C:
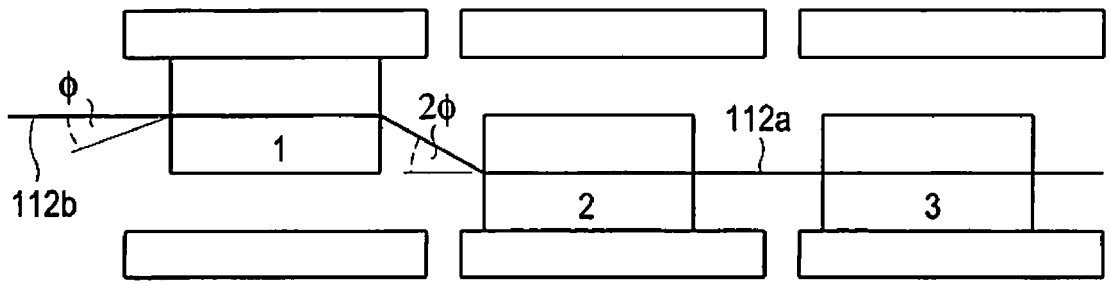
Figure 14D:
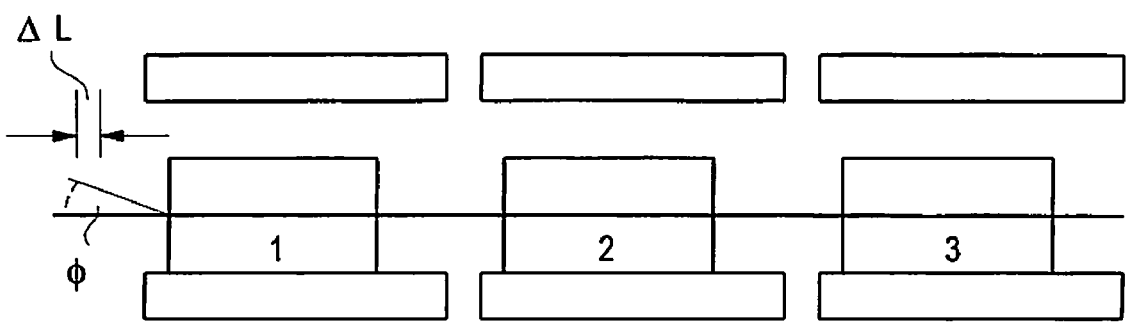

In a manner not too dissimilar from that shown in FIG. 4, for the two element stepping flexure, the sequence begins in FIG. 14a, the topmost diagram, with all three elements disposed on the top surface of the race. The elements are labeled 1, 2 and 3, element 1, the leftmost element, being connected to the load. To move forward (to the left) the sequence is from FIG. 14a to FIG. 14d (top to bottom diagram) and to move backwards (to the right), the sequence is from FIG. 14d to FIG. 14a (bottom to top diagram). In basic macro stepping of the three element embodiment, while an element is moving, the other elements are held in place, as with the two element embodiment. A further detailed description beyond the above is not deemed necessary for a complete understanding of stepping the three element embodiment by one skilled in the art, in view of the description of stepping the two element embodiment provided above.

It should be clear to a person skilled in the art that, as with the two element embodiment, micro stepping, either active or passive, can be accomplished with the three element embodiment in a similar manner, by controlling the frictional force of the elements during movements, and therefore, further explanation is not deemed necessary.

Figure 15A:
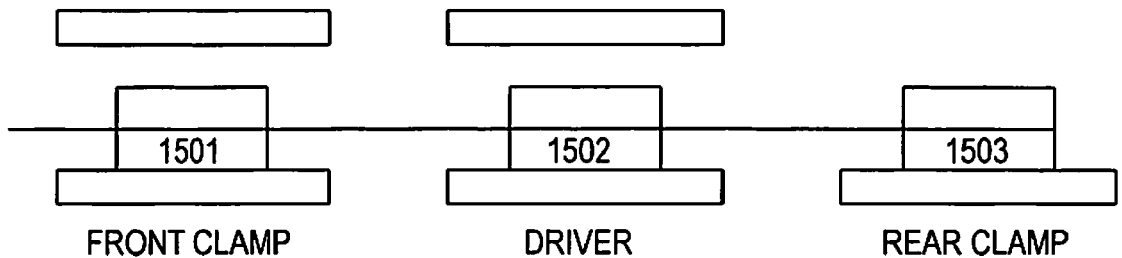
FIG. 15 illustrates a three-element flexure, drive/clamp system according to an embodiment of the invention.
Figure 15B:
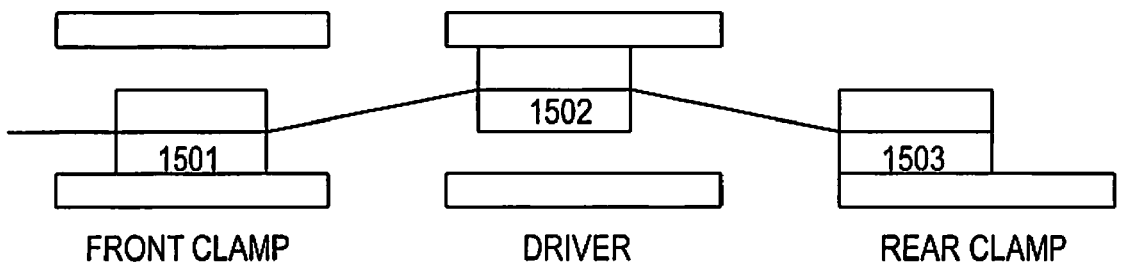
Figure 15C:
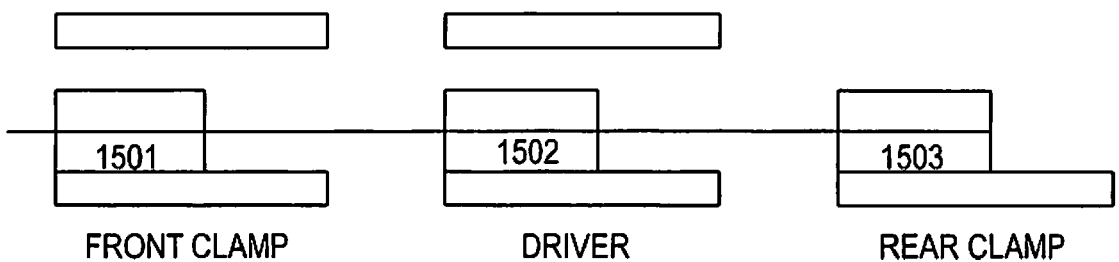

FIG. 15 illustrates a three-element flexure, drive/clamp system according to another embodiment of the invention. In this illustration, the left-most element is referred to as the front clamp 1501, the middle element as the driver 1502, and the right-most element as the rear clamp 1503.

For macro-stepping in the direction to the left of the illustration in FIG. 15, the following series of operations are carried out. Initially, all three elements 1501, 1502 and 1503 are resting on their respective lower races, as shown in 15a. As in the previously described embodiments, each element can be individually controlled to adhere to (clamp) or repel from one of the respective races.

To begin the macro stepping, as shown in 15b, the rear clamp 1503 is relaxed, the front clamp 1501 is clamped in place, and the driver 1502 is moved from the lower race to the upper race, resulting in the rear clamp 1503 being moved some distance to the left. Next, rear clamp 1503 is clamped in place, front clamp 1502 is relaxed, and the driver 1502 is moved from the upper race to the lower race, resulting in the front clamp 1502 (and the load—not shown—attached to the left of the front clamp) being moved some distance to the left. In this procedure, the flexure between the load (not shown) and the front clamp 1501 remains at approximately zero degrees throughout the operation.

To micro-step using the arrangement shown in FIG. 15, during the moving of the driver 1502 from the lower race to the upper race, momentarily the rear clamp 1503 is relaxed and the front clamp 1501 is clamped, the length of time determining the amount of the micro-step.

As can be appreciated, in the embodiment of FIG. 15, only the driver element 1502 is moved between races.

Figure 16A:
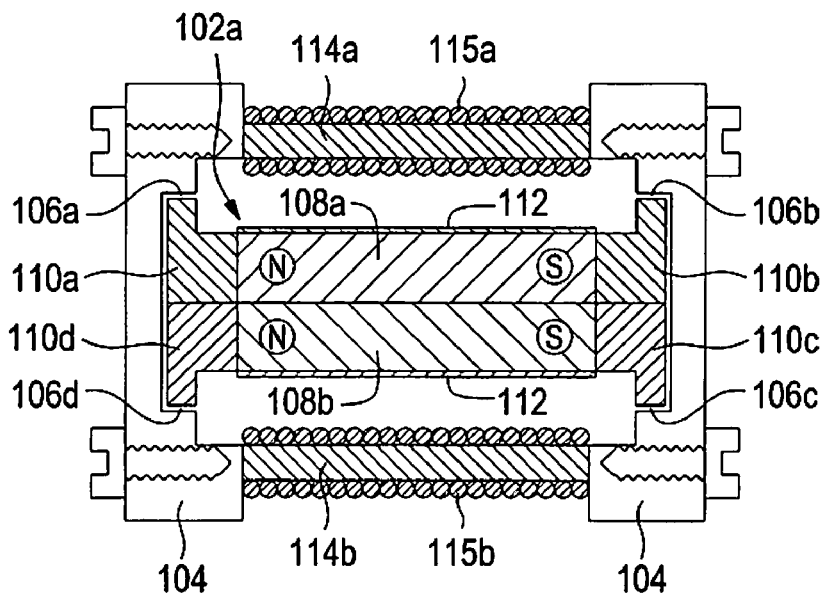
FIGS. 16, 17 and 18 illustrate a linear stepping flexure according to an exemplary embodiment of the present invention where the center flexure of FIGS. 1, 2 and 3, has been replaced with top and bottom flexures.
Figure 16B:
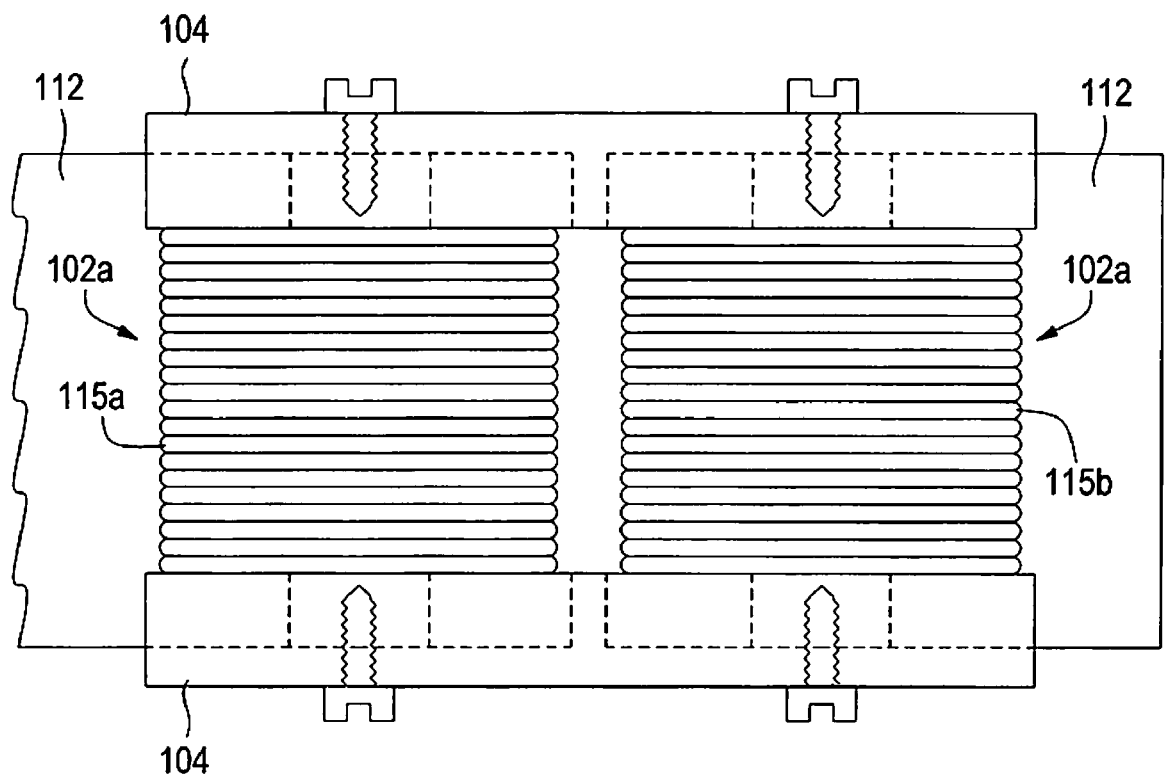
Figure 17C:
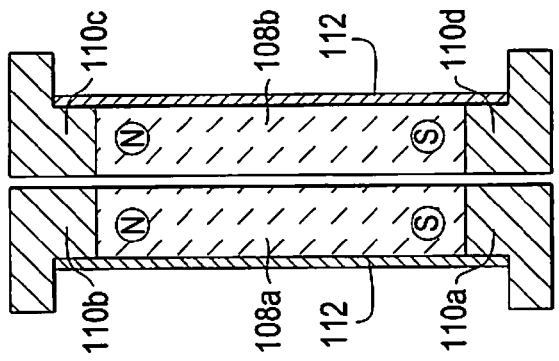
Figure 17A:
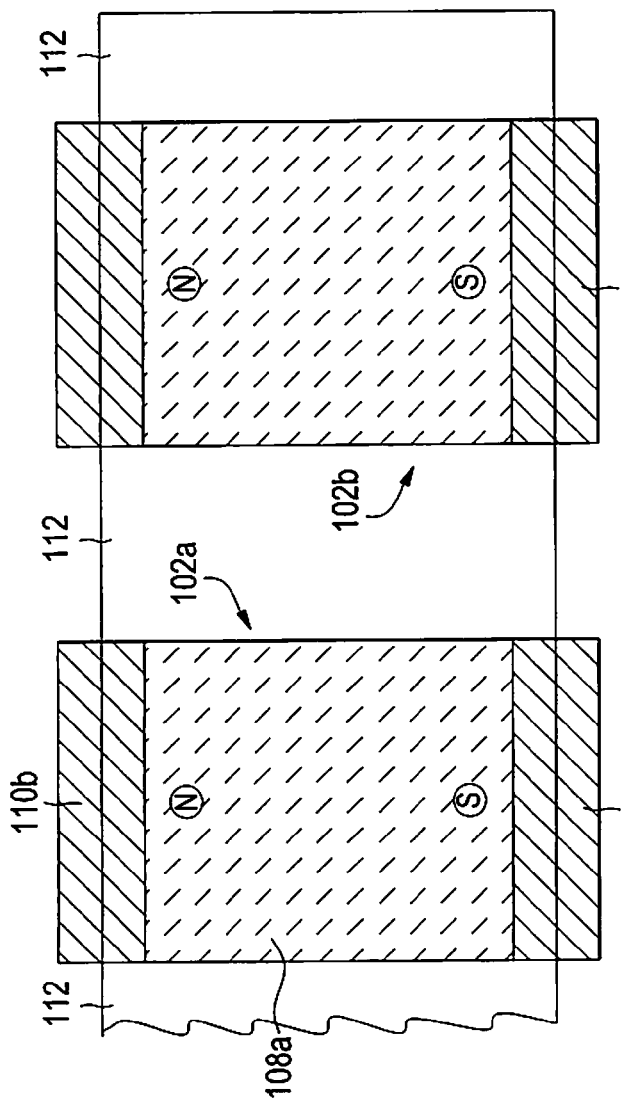
Figure 17B:
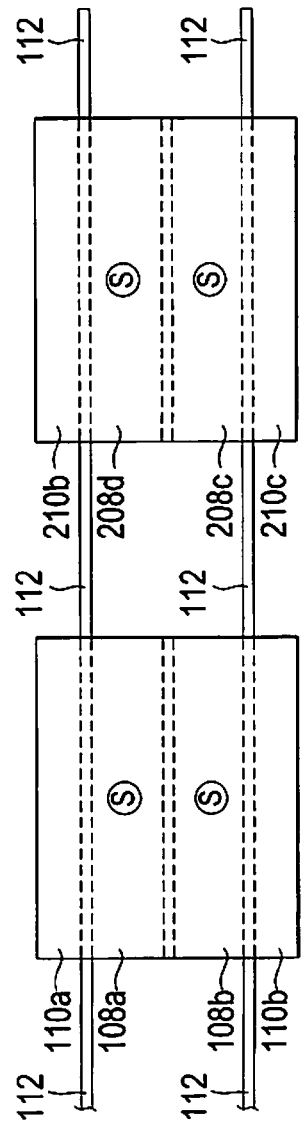
Figure 18A:
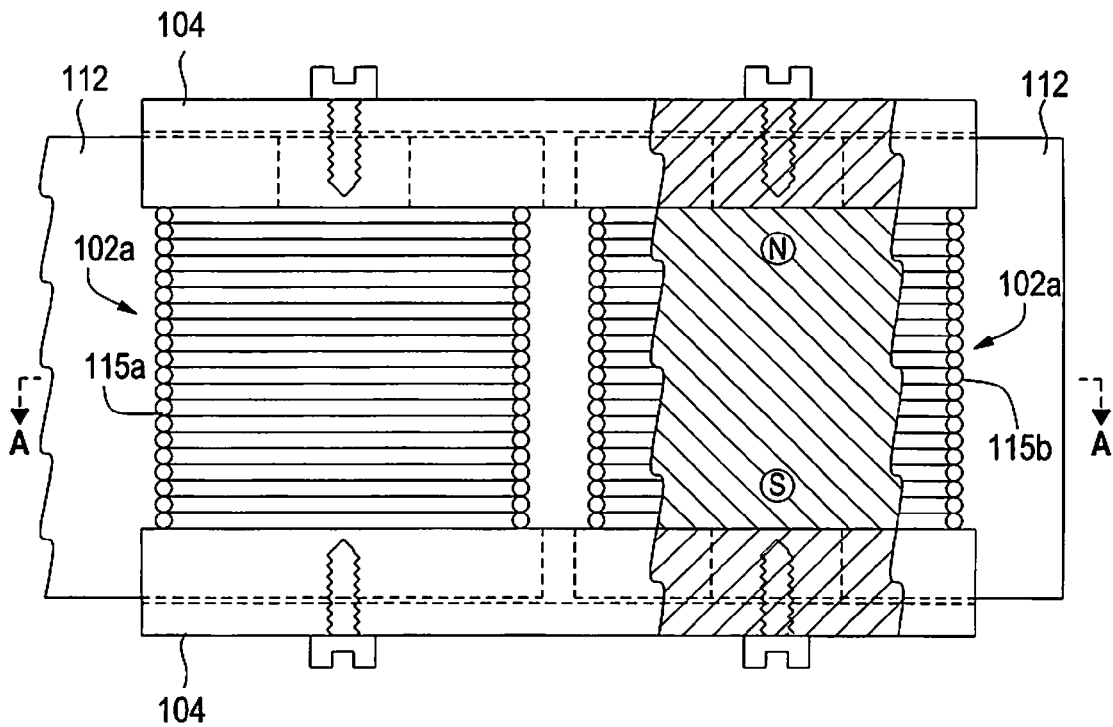
Figure 18B:
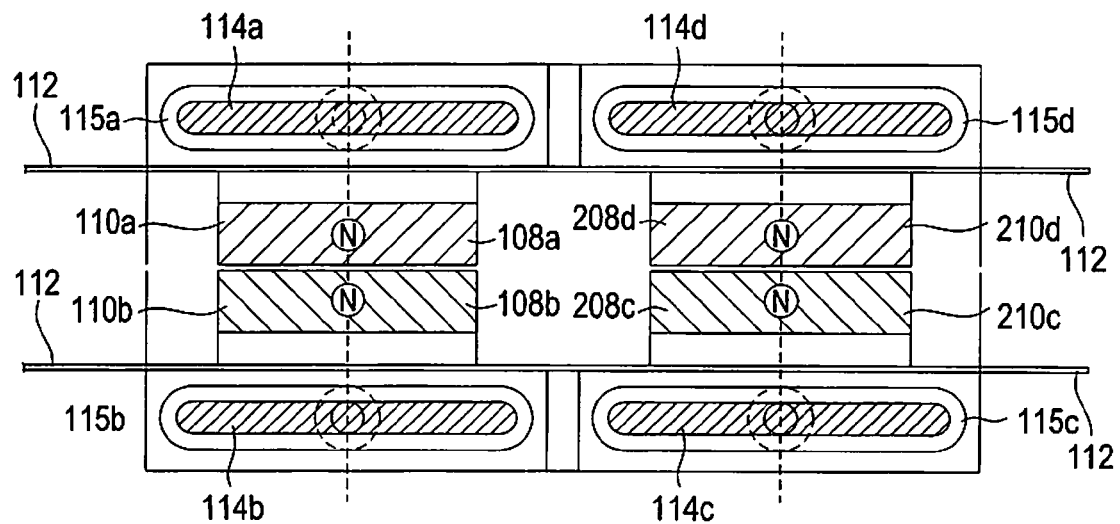

Another embodiment of the invention is illustrated in FIGS. 16, 17 and 18. This embodiment is a variation of the embodiment of the embodiment of FIGS. 1, 2 and 3. Instead of the flexure being disposed in the center, a top and a bottom flexure are used as shown. This has the advantage of reducing the tendency to demagnetization over time, which may be an issue with the embodiment of FIGS. 1, 2 and 3, having only a central flexure.

Additionally, as seen in FIG. 18, the keepers are given curved surfaces (less than 180 degrees) with a relatively large radius of curvature. This has the advantage of reducing the tendency to "walk" when moving between races, which may be an issue with the embodiment using flat keeper surfaces (180 degrees). As used herein, "walk" refers to a relatively undesirable sequence where, when moving between races, a keeper hits the race surface, tips and slides some small distance along the race surface, resulting in an imprecise positioning on the race surface. With the modifications according to this embodiment of the invention, better positioning precision can be achieved.

It is noted that another way of reducing the tendency to demagnetize would be to use a ferrous flexure material, and such is considered to be within the scope of the invention described and claimed herein.

It will be apparent to one skilled in the art that the manner of making and using the claimed invention has been adequately disclosed in the above-written description of the preferred embodiment taken together with the drawings.

It will be understood that the above described preferred embodiment of the present invention are susceptible to various modifications, changes, and adaptations, and the same are intended to be comprehended within the meaning and range of equivalents of the appended claims.

Although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. An actuator for moving a load, comprising:
   a frame forming a race between two surfaces of the frame;
   at least two elements joined together by at least one flexible member, the elements and the at least one flexible member being disposed between the two surfaces of the frame that forms said race, one of the elements further being attached to the load by a portion of the at least one flexible member;
   a moving mechanism disposed to selectively move said at least two elements and selectively retain and release said at least two elements in corresponding positions relative to said two surfaces of the race so as to move a first one of said at least two elements from said first surface of said race to said second surface of said race while retaining a second one of said at least two elements in a fixed position against one of said first and second surface of said race and;
   whereby the actuator incrementally effects movement of the load, by successively changing said corresponding positions of the at least two elements relative to said two surfaces of the race wherein said at least two elements are displaced along a length of said race thereby causing displacement of said load when said at least two elements by independently and successively moving and retaining said element to opposite surface of said race.

2. an actuator for moving a load, comprising a frame forming a race between two surfaces of the frame; at least two elements joined together by at least one flexible member, the elements and the at least one flexible member being disposed between the two surfaces of the frame that forms said race, one of the elements further being attached to the load by a portion of the at least one flexible member; and a moving mechanism disposed to selectively move said at least two elements and selectively retain and release said at least two elements in corresponding positions relative to said two surfaces of the race; and wherein the at least two elements comprise at least two magnets; and wherein the moving mechanism comprises a plurality of coil pairs disposed to attract or repel a corresponding magnet towards or away from one or the other of the two surfaces of the frame that form the race, such that the corresponding element comes into contact with the respective surface of the frame and is retained thereto, or released out of contact with the respective surface of the frame.

3. The actuator according to claim 2, wherein the at least one flexible member comprises flexible, non-magnetic spring steel or aluminum material.

4. The actuator according to claim 2, wherein the at least two elements further comprise respective keepers for holding the respective magnets therebetween.

5. The actuator according to claim 4, wherein the keepers comprise a soft ferromagnetic material.

6. The actuator according to claim 5, wherein magnets are permanent magnets having respective north and south poles.

7. The actuator according to claim 6, wherein the permanent magnets extend between their respective north and south poles in a direction parallel to the plane of the surfaces of the frame forming the race.

8. The actuator according to claim 7, wherein the respective north poles of each of the magnets are oriented in the same direction, and wherein the respective south poles of each of the magnets are oriented in the same direction.

9. The actuator according to claim 8, wherein the permanent magnets extend between their respective north and south poles in a direction perpendicular to a direction of travel of the load.

10. The actuator according to claim 9, wherein each coil of the plurality of coil pairs comprises a coil of wire wrapped around a coil housing, the coil housing having a generally rectangular shape in cross-section with slightly rounded edges, an axis of the coil housing extending in a direction perpendicular to the direction of travel of the load.

11. The actuator according to claim 6, wherein the permanent magnets extend between their respective north and south poles in a direction parallel to the plane of the surfaces of the frame forming the race and parallel to the direction of travel of the load, wherein the respective north poles of each of the magnets are not all oriented in the same direction, and the respective south poles of each of the magnets are not all oriented in the same direction; and wherein each coil of the plurality of coil pairs comprises a coil of wire wrapped around a coil housing having a generally rectangular shape in cross-section with slightly rounded edges, an axis of the coil housing extending in a direction parallel to the direction of travel of the load.

12. The actuator according to claim 1, wherein the elements each have a definite thickness extending in the direction perpendicular to the plane of the surfaces of the frame forming the race, and wherein the surfaces of the frame forming a race have a separation distance at least approximately two-thousandths of an inch greater than the thickness of each of the elements.

13. The actuator according to claim 12, wherein the separation distance is approximately five-thousandths of an inch greater than the thickness of each of the elements.

14. An actuator for moving a load, comprising:
a frame forming a race between two surfaces thereof;
at least two elements joined together by at least one flexible member, the elements and the at least one flexible member being disposed between the two surfaces of the frame that forms said race, one of the elements further being attached to the load by a portion of the at least one flexible member; and
a moving mechanism disposed to selectively retain and release said at least two elements in corresponding positions relative to said two surfaces of the race and;
whereby the actuator incrementally effects movement of the load, by successively changing said corresponding positions of the at least two elements relative to said two surfaces of the race, wherein the at least one flexible member comprises two parallel flexures.

15. The actuator according to claim 14, wherein the two parallel flexures have a respective rung member extending between the two flexures where the flexures extend to join respective elements together, the parallel flexures sandwiching the elements therebetween.

16. The actuator according to claim 14, wherein the two parallel flexures have a respective composite material disposed between the two flexures at least in areas where the flexures extend to join respective elements together, the parallel flexures disposed to sandwich the elements therebetween.

17. The actuator according to claim 14, wherein the two parallel flexures have a composite material disposed between the two flexures throughout, the flexures with composite extending to join respective elements together at corresponding first surfaces thereof.

18. The actuator according to claim 14, wherein the two parallel flexures extend between the respective elements at an angle with respect to the frame surfaces.

19. The actuator according to claim 18, further comprising a rung member extending between the two parallel flexures where the flexures extend to join respective elements together.

20. The actuator according to claim 18, further comprising a composite material disposed between the two parallel flexures at least in areas where the flexures extend to join respective elements together.

21. An actuator for moving a load, comprising:
a frame forming a race between two surfaces thereof;
at least two elements joined together by at least one flexible member, the elements and the at least one flexible member being disposed between the two surfaces of the frame that forms said race, one of the elements further being attached to the load by a portion of the at least one flexible member; and
a moving mechanism disposed to selectively retain and release said at least two elements in corresponding positions relative to said two surfaces of the race and;
whereby the actuator incrementally effects movement of the load, by successively changing said corresponding positions of the at least two elements relative to said two surfaces of the race, wherein the at least one flexible member comprises two sets of parallel flexure segments disposed at least in areas between each element, the sets of segments being joined between each element so as to be offset from each other in the direction of element movement between frame surfaces.

22. An actuator for moving a load, comprising:
a frame forming a race between two surfaces thereof;
at least two elements joined together by at least one flexible member, the elements and the at least one flexible member being disposed between the two surfaces of the frame that forms said race, one of the elements further being attached to the load by a portion of the at least one flexible member; and
a moving mechanism disposed to selectively retain and release said at least two elements in corresponding positions relative to said two surfaces of the race and;
whereby the actuator incrementally effects movement of the load, by successively changing said corresponding positions of the at least two elements relative to said two surfaces of the race, wherein each of the elements can assume one of at least three states with respect to the surfaces of the frame that forms a race, the at least three states being controlled by the moving mechanism, the at least three states comprising: in full frictional contact with and therefore retained against a surface of the frame in a relatively immovable condition, in contact with said surface of the frame but in a relatively movable condition, and out of contact with said surface of the frame; wherein by activation of the moving mechanism, each of the elements can be moved independently between the surfaces of the frame forming a race and assume a new position thereon, the new position assumed by an element after moving between the surfaces of the frame forming a race being dependent on at least the position on the surfaces of the frame forming the race of another of the elements to which the moved element is joined, the length of the at least one flexible member joining the respective elements, and the state of another element to which it is joined; wherein by activation of the moving mechanism, each of the elements can be moved independently along one of the surfaces of the frame forming a race and assume a new position thereon, the new position assumed by an element after moving along the frame surface being dependent on at least the position on a surface of the frame forming the race of another of the elements to which the moved element is joined, the length of the at least one flexible member joining the respective elements, the state of the element being moved, and the state of the other element to which it is joined; wherein an element will remain in full frictional contact with and therefore is retained to a surface of the frame in a relatively immovable condition after de-activation of the moving mechanism; and wherein the at least one flexible member is joined to the load at a point approximately mid-way between the two race surfaces formed by the frame.

23. An actuator for moving a load, comprising:
a race defined between a first surface opposite a second surface;
at least two elements movingly disposed within said race, said at least two elements being joined together by at least one flexible member and one of the elements further being connected to the load;
a moving mechanism disposed to selectively move and retain said at least two elements between various corresponding fixed positions relative to said first and second surfaces; and
whereby the actuator incrementally effects movement of the load by successively changing said corresponding positions of the at least two elements relative to said two surfaces of the race and wherein said moving mechanism is provided to move a first one of said at least two elements from said first surfaces of said race to said second surface of said race while retaining a second one of said at least two elements in a fixed position against one of said first and second surfaces of said at least two elements are displaced along a length of said race thereby causing displacement of said load when said at least two elements by independently and successively moving and retaining said element to opposite surface of said race.

24. The actuator according to claim 23, wherein the at least two elements comprise at least two magnets; and wherein the moving mechanism comprises a plurality of coil pairs disposed to attract or repel a corresponding magnet towards or away from said first and second surfaces of the race such that when the corresponding element comes into contact with the respective surface of the race it is is retained thereto.

25. The actuator according to claim 24, wherein the at least one flexible member comprises flexible, non-magnetic spring steel or aluminum material.

26. The actuator according to claim 24, wherein the at least two elements further comprise respective keepers for holding the respective magnets therebetween.

27. The actuator according to claim 26, wherein the keepers comprise a soft ferromagnetic material.

28. The actuator according to claim 27, wherein magnets are permanent magnets having respective north and south poles 29. The actuator according to claim 28, wherein the permanent magnets extend between their respective north and south poles in a direction parallel to the plane of the surfaces of the frame forming the race.

30. The actuator according to claim 29, wherein the respective north poles of each of the magnets are oriented in the same direction, and wherein the respective south poles of each of the magnets are oriented in the same direction.

31. The actuator according to claim 29, wherein the permanent magnets extend between their respective north and south poles in a direction perpendicular to a direction of travel of the load.

32. The actuator according to claim 31, wherein each coil of the plurality of coil pairs comprises a coil of wire wrapped around a coil housing, the coil housing having a generally rectangular shape in cross-section with slightly rounded edges, an axis of the coil housing extending in a direction perpendicular to the direction of travel of the load.

33. The actuator according to claim 29, wherein the permanent magnets extend between their respective north and south poles in a direction parallel to the plane of the surfaces of the frame forming the race and parallel to the direction of travel of the load, wherein the respective north poles of each of the magnets are not all oriented in the same direction, and the respective south poles of each of the magnets are not all oriented in the same direction; and wherein each coil of the plurality of coil pairs comprises a coil of wire wrapped around a coil housing having a generally rectangular shape in cross-section with slightly rounded edges, an axis of the coil housing extending in a direction parallel to the direction of travel of the load.

34. The actuator according to claim 23, wherein the elements each have a definite thickness extending in the direction perpendicular to the plane of the surfaces of the frame forming the race, and wherein the surfaces of the frame forming a race have a separation distance at least approximately two-thousandths of an inch greater than the thickness of each of the elements.

35. The actuator according to claim 34, wherein the separation distance is approximately five-thousandths of an inch greater than the thickness of each of the elements.

36. An actuator comprising a slide, a frame and a plurality of current carrying wire coils, the slide being movable within the frame in a stepping manner by selective activation of the coils;
   wherein the slide comprises:
      at least a first and a second contact element, each contact element having at least one permanent magnet disposed between respective keepers, each contact element having a thickness; and
      at least one flexible member having a first portion joining the contact elements to each other, and having a second portion for joining one of the contact elements to the load by a second portion of the at least one flexible member;
   wherein the frame comprises:
      a first race surface and a second race surface, separated by a distance greater than the contact elements thickness;
      wherein the contact elements and the at least one flexible member are disposed between the race surfaces; wherein the race surfaces are composed of a material to which an element will stick once engaged in contact therewith;
      wherein the plurality of coils comprises at least a first and second set of coils, each set of coils comprising a first coil disposed adjacent the first race surface, and a second coil disposed adjacent the second race surface, a respective first coil for moving a corresponding contact element towards or away from the first race surface to contact or separate from the first race surface when activated, and a respective second coil for moving a corresponding contact element towards or away from the second race surface to contact or separate from the second race surface when activated, the coils thereby being able to move their corresponding contact element along or between respective first and second race surfaces;
      wherein each coil of the coil sets can be individually selectively activated;
      wherein the load is selectively movable a determinable step distance towards or away from the slide by selective activation of said coils and thereby changing positions of said contact elements between and along said race surfaces, one of sat contact elements being joined to the load by the second portion of the at least one flexible member to facilitate displacement of said load; and
      wherein a contact element will remain stuck to a surface of the frame in a relatively immovable condition after de-activation of the moving mechanism.

37. The actuator according to claim 36, wherein the load is selectively movable a determinable step distance towards or away from the frame by alternatively changing a position between or along race surfaces of a first contact element and a position between or along race surfaces of another contact element which is joined to the first contact element by selective coil activation.

38. An actuator for moving a load according to claim 1, wherein the at least two elements comprise at least two movable members made of a material permeable to magnetic flux; wherein the moving mechanism comprises a plurality of coil and magnet pairs disposed to attract a corresponding element towards one or the other of the two surfaces of the frame that form the race, by completion of a magnetic flux circuit through the corresponding element when a respective coil is energized, such that the corresponding element comes into contact with the respective surface of the frame and is retained thereto by virtue of remnant forces in the respective coil core even after the respective coil is de-energized.

39. An actuator according to claim 36, wherein the magnets are permanent thin magnets having respective north and south poles oriented in a direction parallel to the planes of the race surfaces.

40. An actuator according to claim 36, wherein the magnets are permanent thin magnets having respective north and south poles oriented in a direction perpendicular to the planes of the race surfaces; wherein each coil of the plurality of coil sets comprises a coil of wire wrapped around a coil housing having an axis which extends in a direction perpendicular to the planes of the race surfaces; wherein the keepers comprise asymmetric wrap-around keepers having insulators at ends thereof oriented to extend perpendicular to the plane of the surfaces of the frame forming the race.

* * * * *